(12) United States Patent
Mizuguchi et al.

(10) Patent No.: US 9,244,970 B2
(45) Date of Patent: Jan. 26, 2016

(54) COMMUNICATION ASSISTANCE DEVICE, COMMUNICATION ASSISTANCE METHOD, AND COMPUTER READABLE RECORDING MEDIUM

(75) Inventors: Hironori Mizuguchi, Tokyo (JP); Dai Kusui, Tokyo (JP)

(73) Assignee: NEC CORPORATION, Tokyo (JP)

(*) Notice: Subject to any disclaimer, the term of this patent is extended or adjusted under 35 U.S.C. 154(b) by 139 days.

(21) Appl. No.: 13/810,478

(22) PCT Filed: Jul. 13, 2011

(86) PCT No.: PCT/JP2011/065960
§ 371 (c)(1),
(2), (4) Date: Jan. 16, 2013

(87) PCT Pub. No.: WO2012/017787
PCT Pub. Date: Feb. 9, 2012

(65) Prior Publication Data
US 2013/0117296 A1 May 9, 2013

(30) Foreign Application Priority Data

Aug. 6, 2010 (JP) ................................. 2010-177374

(51) Int. Cl.
*G06F 7/00* (2006.01)
*G06F 17/30* (2006.01)
*G06Q 50/00* (2012.01)

(52) U.S. Cl.
CPC .......... *G06F 17/30386* (2013.01); *G06Q 50/01* (2013.01)

(58) Field of Classification Search
CPC .............. G06F 17/30; G06F 17/30241; G06F 17/30386; G06F 17/30864; G06F 17/30867
USPC ........................................................ 707/758
See application file for complete search history.

(56) References Cited

U.S. PATENT DOCUMENTS 8,010,602 B2 * 8/2011 Shen et al. ..................... 709/204
8,549,651 B2 * 10/2013 Callahan et al. ................ 726/26
2008/0162692 A1 * 7/2008 Schultz et al. ................. 709/224

(Continued)

FOREIGN PATENT DOCUMENTS

JP   H11296461 A   10/1999
JP   2005157973 A   6/2005

(Continued)

OTHER PUBLICATIONS

The international search report for PCT/JP2011/065960 mailed on Oct. 18, 2011.

(Continued)

*Primary Examiner* — Hosain Alam
*Assistant Examiner* — Nicholas Allen

(57) ABSTRACT

A communication assistance device (10) includes a communication level determination unit (11) so as to determine a level of a relationship between users who communicate with each other. The communication level determination unit (11) determines the level (communication level) of the relationship between the users based on similarity between the users obtained from preference information showing preferences of the users, and on user action records showing records of actions taken by a certain user toward a partner user with whom the certain user communicates out of the users.

35 Claims, 16 Drawing Sheets

(56) References Cited

U.S. PATENT DOCUMENTS

| | | | | |
|---|---|---|---|---|
| 2008/0270038 | A1* | 10/2008 | Partovi et al. | 702/19 |
| 2009/0006120 | A1* | 1/2009 | Huang | 705/1 |
| 2009/0216859 | A1* | 8/2009 | Dolling | 709/218 |
| 2009/0287813 | A1* | 11/2009 | Yibin et al. | 709/224 |
| 2010/0057858 | A1* | 3/2010 | Shen et al. | 709/206 |
| 2010/0058196 | A1* | 3/2010 | Krishnan et al. | 715/747 |
| 2010/0146118 | A1* | 6/2010 | Van Wei | 709/225 |
| 2010/0325218 | A1* | 12/2010 | Castro et al. | 709/206 |
| 2011/0282750 | A1* | 11/2011 | Rosen | 705/14.66 |
| 2012/0016948 | A1* | 1/2012 | Sinha | 709/207 |

FOREIGN PATENT DOCUMENTS

| | | | |
|---|---|---|---|
| JP | 2009093614 A | 4/2009 | |
| JP | 2010066814 A | 3/2010 | |
| JP | 2010165097 A | 7/2010 | |

OTHER PUBLICATIONS

Michael Terry et al. "Social Net: Using Patterns of Physical Proximity Over Time to Infer Shared Interests." CHI '02: CHI '02 Extended Abstracts on Human Factors in Computing Systems (2002): 816-817.

Akihiro Kusaga, "A Chat Function Integrated into SNS for Expanding Circles of Friends", Symposium on Multimedia, Distributed, Cooperative and Mobile Systems, (DICOMO2007) Ronbunshu, IPSJ Symposium Series, vol. 2007, No. 1, [CD-ROM], Jul. 4, 2007, vol. 2007, pp. 1471 to 1475.

Takashi Yoshino, "Effect of Topic Offer Support that uses Information Stored in an SNS", Symposium on Multimedia, Distributed, Cooperative and Mobile Systems (DICOMO2008) Ronbunshu, IOSJ Symposium Series, vol. 2008, No. 1, [CD-ROM], Jul. 9, 2008, vol. 2008, pp. 1549 to 1557.

* cited by examiner

FIG. 3

USER ACTION RECORDS

| USER | PARTNER USER | ACTION | TIME |
|---|---|---|---|
| ... | ... | ... | ... |
| A | B | DIARY VIEWING | 2010-07-15-18:20 |
| A | B | MESSAGE TRANSMISSION | 2010-07-15-18:50 |
| A | C | PROFILE VIEWING | 2010-07-16-17:00 |
| C | A | PROFILE VIEWING | 2010-07-16-18:00 |

FIG. 4

| USER 1 | USER 2 | PREFERENCE SIMILARITY |
|--------|--------|----------------------|
| A | B | 0.5 |
| A | C | 0.7 |
| B | C | 0.1 |

FIG. 5

| USER 1 | USER 2 | COMMUNICATION LEVEL | PREFERENCE SIMILARITY | USER INTEREST DEGREE (USER 1, USER 2) | USER INTEREST DEGREE (USER 2, USER 1) |
|---|---|---|---|---|---|
| ... | ... | ... | ... | ... | ... |
| A | B | CANDIDATE-FOR-FRIEND WITH SIMILAR PREFERENCES | 0.5 | 2.0 | 0 |
| A | C | STRANGER | 0.2 | 0 | 0 |
| B | C | STRANGER | 0.1 | 0 | 0 |
| ... | ... | ... | ... | ... | ... |

FIG. 6

| USER 1 | USER 2 | COMMUNICATION LEVEL | PREFERENCE SIMILARITY | USER INTEREST DEGREE (USER 1, USER 2) | USER INTEREST DEGREE (USER 2, USER 1) |
|---|---|---|---|---|---|
| ... | ... | ... | ... | ... | ... |
| A | B | CANDIDATE-FOR-FRIEND WITH SIMILAR PREFERENCES | 0.5 | 7.0 | 0 |
| A | C | STRANGER WITH SIMILAR PREFERENCES | 0.7 | 1.0 | 1.0 |
| B | C | STRANGER | 0.1 | 0 | 0 |
| ... | ... | ... | ... | ... | ... |

FIG. 8

RECOMMENDED ACTION RECORDS

| USER | PARTNER USER | RECOMMENDED ACTION | TIME |
|---|---|---|---|
| ... | ... | ... | ... |
| B | A | MESSAGE TRANSMISSION | 2010-07-15-18:10 |
| A | B | MESSAGE TRANSMISSION | 2010-07-15-18:40 |
| A | C | PROFILE VIEWING | 2010-07-16-17:00 |
| C | A | PROFILE VIEWING | 2010-07-16-18:00 |

FIG. 11

TOPICS

| TOPIC ID | CONTENTS |
|---|---|
| TOPIC 1 | BICYCLE TOUR AROUND THE WORLD WITH MOBILE TELEPHONE |
| TOPIC 2 | RELEASE OF BICYCLE GPS COMPATIBLE WITH LAPTOP COMPUTERS |
| TOPIC 3 | GREAT TRICKS FOR EXTENDING MOBILE TELEPHONE BATTERY LIFE |
| ... | |

FIG. 12

USER MODELS

| USER | MODEL |
|------|-------|
| A | BICYCLE: 1, PC: 2 |
| B | BICYCLE: 1, MOBILE TELEPHONE: 2 |
| C | MOBILE TELEPHONE: 2, INTERNET: 2 |
| ... | |

FIG. 14

DEGREES OF PREFERENCE FOR TOPICS

| USER | TOPIC 1 | TOPIC 2 | TOPIC 3 | ... |
|------|---------|---------|---------|-----|
| A | 0.5 | 0.8 | 0 | ... |
| B | 0.8 | 0.5 | 0.4 | ... |
| C | 0.5 | 0 | 0.5 | ... |
| ... | ... | ... | ... | ... |

COMMUNICATION ASSISTANCE DEVICE, COMMUNICATION ASSISTANCE METHOD, AND COMPUTER READABLE RECORDING MEDIUM

This application is a National Stage Entry of PCT/JP2011/065960 filed Jul. 13, 2011, which claims priority from Japanese Patent Application 2010-177374 filed Aug. 6, 2010, the contents of all of which are incorporated herein by reference, in their entirety.

TECHNICAL FIELD

The present invention relates to a communication assistance device, a communication assistance method, and a computer-readable recording medium having recorded therein a program for realizing the communication assistance device and the communication assistance method.

BACKGROUND ART

In recent years, communication assistance systems have been proposed. Communication assistance systems assist development of human relationships based on how close hobbies and preferences of one person to those of another. For example, Non-Patent Document 1 discloses one example of conventional communication assistance systems.

The communication assistance system disclosed in Non-Patent Document 1 aims to make two people acquainted with each other over time. More specifically, this communication assistance system first searches for two people with similar preferences and an agent who can mediate these two people. Here, whether or not their preferences are similar is determined based on their life patterns in the past, e.g. whether or not they have visited the same place.

This communication assistance system then judges whether or not the three people who have been searched for are at the same place, and when judging that the three people are at the same place, urges the agent to mediate the two people with similar preferences.

In this way, the communication assistance system disclosed in Non-Patent Document 1 provides an opportunity for the two people with similar preferences to be introduced to each other via the agent. This makes it easy for the two people who are introduced to each other to communicate with each other, compared to the case where they have to initiate conversation with a stranger who shares similar interests.

Although the communication assistance system disclosed in Non-Patent Document 1 aims to assist communication in a real space, it can likewise assist communication in a virtual space such as a social networking service (SNS).

CITATION LIST

Non-Patent Documents
  Non-Patent Document 1:
  Michael Terry et al. "Social Net: Using Patterns of Physical Proximity Over Time to Infer Shared Interests." CHI '02: CHI '02 Extended Abstracts on Human Factors in Computing Systems (2002): 816-817.

DISCLOSURE OF THE INVENTION

Problem to be Solved by the Invention

However, the communication assistance system disclosed in Non-Patent Document 1 has the problem that it does not grasp human relationships in a stepwise manner and therefore cannot provide communication assistance in accordance with the levels of human relationships.

More specifically, the communication system disclosed in Non-Patent Document 1 attempts to give two people a chance to communicate with each other via an agent. At this time, the two people are suddenly introduced to and encouraged to befriend each other although they are strangers, i.e. they do not know each other at all. The two people may thus end up being unfamiliar with each other, with the result that their communication does not last long. The same goes for communication in a virtual space.

Level-based communication assistance can be provided as long as human relationships, such as strangers, strangers with similar preferences, people with similar preferences and interest in each other, and friends, can be grasped in a stepwise manner. That is to say, communication assistance is required that takes into consideration the intermediate levels between the level at which the two people are strangers and the level at which they become friends.

With consideration of such intermediate levels, the two people can get to know each other and cultivate a human relationship. Furthermore, in this case, even if users move through different levels and end up having similar preferences, they will not suddenly jump to the level at which they become friends, and accordingly a human relationship can be reliably cultivated. In view of the above, in a communication assistance system, it is important to determine communicational human relationships in a stepwise manner and provide level-based assistance.

One example of the aims of the present invention is to provide a communication assistance device, a communication assistance method and a computer-readable recording medium that can solve the above problem by determining a level of a relationship between users who communicate with each other.

Means for Solving the Problem

In order to achieve the above aim, a communication assistance device according to one aspect of the present invention includes: a communication level determination unit that determines a level of a relationship between users based on similarity between the users and on user action records, the similarity between the users being obtained from preference information showing preferences of the users, and the user action records showing records of actions taken by a certain user toward a partner user with whom the certain user communicates out of the users.

Furthermore, in order to achieve the above aim, a communication assistance method according to one aspect of the present invention includes: a communication level determination step of determining a level of a relationship between users based on similarity between the users and on user action records, the similarity between the users being obtained from preference information showing preferences of the users, and the user action records showing records of actions taken by a certain user toward a partner user with whom the certain user communicates out of the users.

Furthermore, in order to achieve the above aim, a computer-readable recording medium according to one aspect of the present invention has recorded therein a program including instructions for causing a computer to execute: a communication level determination step of determining a level of a relationship between users based on similarity between the users and on user action records, the similarity between the users being obtained from preference information showing preferences of the users, and the user action records showing records of actions taken by a certain user toward a partner user with whom the certain user communicates out of the users.

Effects of the Invention

As set forth above, a communication assistance device, a communication assistance method and a computer-readable recording medium according to the present invention can determine a level of a relationship between users who communicate with each other.

BRIEF DESCRIPTION OF THE DRAWINGS

FIG. 3 shows examples of user action records accumulated in a user action record accumulation unit.

FIG. 4 shows examples of preference similarities accumulated in a preference similarity accumulation unit.

FIG. 5 shows examples of communication levels accumulated in a communication level accumulation unit.

FIG. 6 shows examples of communication levels obtained as a result of updating the communication levels shown in FIG. 5.

FIG. 8 shows examples of recommended action records accumulated in a recommended action record accumulation unit.

FIG. 11 shows examples of topics accumulated in a topic accumulation unit.

FIG. 12 shows examples of user models accumulated in a user model accumulation unit.

FIG. 14 shows examples of degrees of preference calculate by a topic recommendation unit.

DESCRIPTION OF EMBODIMENTS

Embodiment 1

Figure 1:
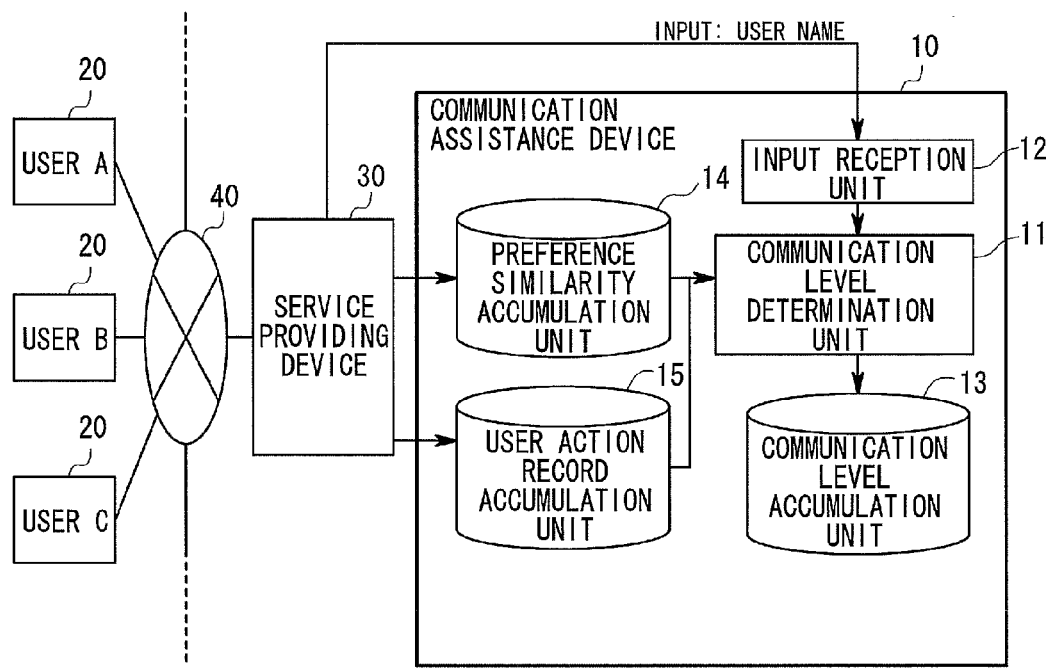
FIG. 1 is a block diagram showing a configuration of a communication assistance device according to Embodiment 1 of the present invention.

The following describes a communication assistance device, a communication assistance method and a program according to Embodiment 1 of the present invention with reference to FIGS. 1 to 6. First, a description is given of a configuration of the communication assistance device according to the present Embodiment 1 with reference to FIG. 1. FIG. 1 is a block diagram showing a configuration of the communication assistance device according to Embodiment 1 of the present invention.

As shown in FIG. 1, a communication assistance device 10 according to the present Embodiment 1 is connected to a service providing device 30. The service providing device 30 is a server device that provides communication services such as blog services, Twitter, and social networking services (SNS). The service providing device 30 is connected to terminal devices 20 of users via a network 40 such as the Internet. In the present Embodiment 1, the communication assistance device 10 assists communication in a communication space provided by the service providing device 30 on the network.

As shown in FIG. 1, the communication assistance device 10 includes a communication level determination unit 11. The communication level determination unit 11 first obtains similarities between users, which are calculated from preference information showing preferences of the users (hereinafter referred to as "preference similarities"), as well as user action records showing records of actions taken by a certain user toward a partner user with whom the certain user communicates out of the users. The communication level determination unit 11 then determines a level of a relationship between users (hereinafter referred to as "communication level") based on preference similarities between the users and the user action records of the users.

In this manner, the communication assistance device 10 can determine a level of a relationship between users who communicate with each other. The communication assistance device 10 can provide communication assistance to users who communicate eath other via the service providing device 30, in accordance with the determined level. By thus providing level-based communication assistance, the relationship between the users can be cultivated over time.

The following is a more specific description of the configuration of the communication assistance device 10. As shown in FIG. 1, the communication assistance device 10 according to the present Embodiment 1 includes, in addition to the communication level determination unit 11, an input reception unit 12, a communication level accumulation unit 13, a preference similarity accumulation unit 14, and a user action record accumulation unit 15. General operations of these units are as follows.

The input reception unit 12 receives, as the input, a user name from the service providing device 30. In the present Embodiment 1, the service providing device 30 inputs at least one user name of a user for whom a communication level is to be determined (the aforementioned certain user). When the user name is input, the communication level determination unit 11 determines a communication level between the user corresponding to the input user name (hereinafter referred to as "input user") and another user with whom the input user communicates (hereinafter referred to as "partner user"), and accumulates the determined communication level in the communication level accumulation unit 13.

The preference similarity accumulation unit 14 accumulates preference similarities between users as will be described later. User models, which will be described later with reference to FIG. 12, are one example of preference information used to calculate preference similarities. User models include keywords showing users' preferences. Alternatively, the preference information may be a list of information showing information in which the users are interested separately from information in which the users are not interested. The user action record accumulation unit 15 accumulates user action records as will be described later.

More specifically, the communication level determination unit 11 first refers to the user action records accumulated in the user action record accumulation unit 15 and obtains the types and frequencies of actions that the input user has taken toward a partner user. Based on the types and frequencies of the actions, the communication level determination unit 11 calculates a user interest degree which is a degree of interest that the input user takes in the partner user. Furthermore, the communication level determination unit 11 refers to the preference similarities between users accumulated in the preference similarity accumulation unit 14 and obtains preference similarity indicating a degree of similarity between preferences of the input user and preferences of the partner user.

Thereafter, the communication level determination unit 11 refers to communication levels that have been accumulated in the communication level accumulation unit 13 up to the current time. Based on the obtained preference similarity and the calculated user interest degree, the communication level determination unit 11 judges whether the relationship between the input user and the partner user is in an advancing state, a stalled state, or a receding state. The communication level determination unit 11 then updates the communication level using the result of the judgment and accumulates the updated communication level in the communication level accumulation unit 13.

Note that communication levels represent relationships between users, and users move through different communication levels in a stepwise manner. Examples of communication levels include a stranger level, an intermediate level between strangers and friends, and a friend level. The intermediate level may be classified into a plurality of levels. In the present case, the following levels (A1) to (A4) may be used as communication levels.

(A1) Stranger level: the input user is not similar to the partner user in preferences and is not interested in the partner user.

(A2) Stranger level with similar preferences and no knowledge of name: the input user is similar to the partner user in preferences but is not interested in the partner user.

(A3): Candidate-for-friend level with similar preferences: the input user is similar to the partner user in preferences and is interested in the partner user.

(A4) Friend level: the input user and the partner user have similar preferences and actively exchange information with each other.

Note that the aforementioned term "no knowledge of name" denotes the state where the input user is aware of the existence of the partner user but does not know the user name of the partner user.

Classification of communication levels may be even more specific. For example, the above level (A2), i.e. the stranger level with similar preferences, and the above level (A3), i.e. the candidate-for-friend level with similar preferences, may each be classified into an existence awareness level at which the input user is aware of the existence of the partner user and an information exchange level at which the input user exchanges information with the partner user. In this case, the following levels (B1) to (B6) may be used as communication levels.

(B1) Stranger level: the input user is not similar to the partner user in preferences and is not interested in the partner user.

(B2) Existence awareness level at stranger level with similar preferences and no knowledge of name: the input user is similar to the partner user in preferences, is not interested in the partner user, and is aware of the existence of the partner user.

(B3) Information exchange level at stranger level with similar preferences and no knowledge of name: the input user is similar to the partner user in preferences, is not interested in the partner user, and exchanges information with the partner user.

(B4): Existence awareness level at candidate-for-friend level with similar preferences: the input user is similar to the partner user in preferences, is interested in the partner user, and is aware of the existence of the partner user.

(B5): Information exchange level at candidate-for-friend level with similar preferences: the input user is similar to the partner user in preferences, is interested in the partner user, and exchanges information with the partner user.

(B6) Friend level: the input user and the partner user have similar preferences and actively exchange information with each other.

In the present Embodiment 1, the preference similarity accumulation unit 14 accumulates preference similarities between all users of the service provided by the service providing device 30. The preference similarities are calculated based on similarity between preference information of one user and preference information of another user. In the present embodiment, upon obtaining preference information of users, the service providing device 30 outputs the obtained preference information to the preference similarity accumulation unit 14. Then, based on the output preference information of users, the preference similarity accumulation unit 14 calculates preference similarities between the users and accumulates the calculated preference similarities.

Note that preference information of a user denotes information showing what the user is interested in and curious about. Examples of the preference information include a group of terms showing what the user is interested in, a group of news articles about which the user is curious, and places where the user frequently visits.

The more similar preference information of one user is to preference information of another user, the larger value the calculated preference similarity between the users has. For example, preference similarity between users can be obtained by generating term vectors based on groups of terms in which the users are interested and calculating cosine similarity between the term vectors. In this case, the cosine similarity between the term vectors is used as the preference similarity between the users. Alternatively, preference similarity between users may be obtained by generating news article vectors based on groups of news articles about which the users are curious and calculating cosine similarity between the news article vectors. In this case, the cosine similarity between the news article vectors is used as the preference similarity between the users.

Furthermore, in the present Embodiment 1, the user action record accumulation unit 15 accumulates records of actions that a certain user has taken toward another user, e.g. identifiers for identifying the actions and times when the actions were taken. Note that in the present Embodiment 1, actions denote operations performed by users via the terminal devices 20. In particular, actions include operations performed by a certain user with respect to another user, and operations equivalent to responses with respect to operations performed by another user.

More specifically, operations performed by a certain user with respect to another user include viewing of profile information, viewing of diaries, comments to diaries, transmission of messages, disclosure of a name, and the like. On the other hand, operations equivalent to responses with respect to operations performed by another user include viewing of transmitted messages, transmission of return messages, and the like.

Figure 2:
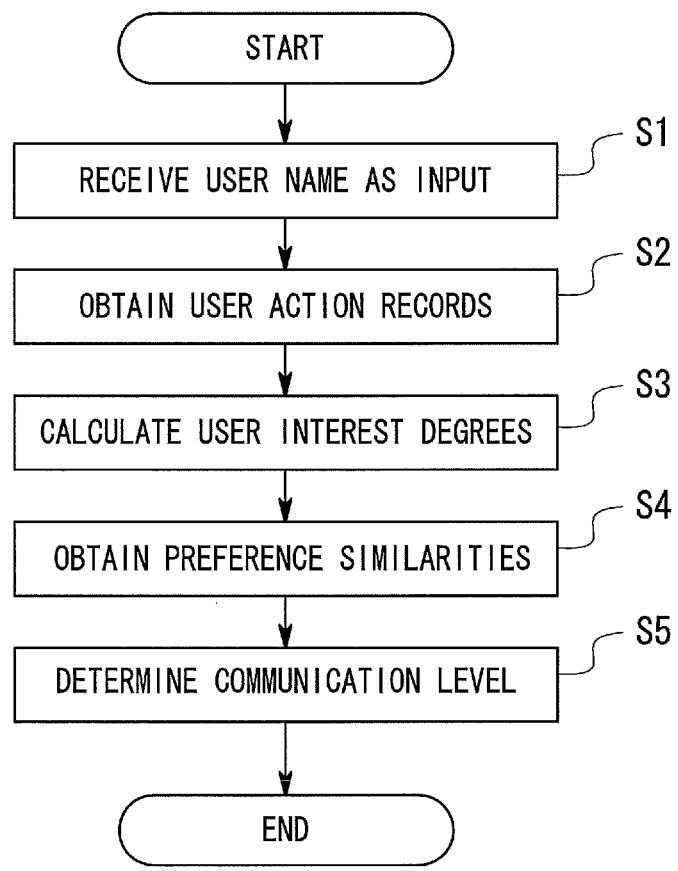
FIG. 2 is a flowchart showing the operations of the communication assistance device according to Embodiment 1 of the present invention.

A description is now given of the operations of the communication assistance device 10 according to Embodiment 1 of the present invention with reference to FIG. 2. FIG. 2 is a flowchart showing the operations of the communication assistance device according to Embodiment 1 of the present invention. In the following description, FIG. 1 shall be referred to where appropriate. Note that in the present Embodiment 1, a communication assistance method is implemented by causing the communication assistance device 10 to operate. Therefore, the following description of the operations of the communication assistance device 10 applies to the communication assistance method according to the present Embodiment 1.

First, as shown in FIG. 2, the input reception unit 12 of the communication assistance device 10 receives, as the input from the service providing device 30, a user name of a user for whom a communication level is to be determined (step S1).

For example, in the case where the service providing device 30 inputs a user name of user A, the input reception unit 12 considers user A as an input user. Note that this is merely an example. Alternatively, in order to determine a communication level between a certain user and his/her partner user, the input reception unit 12 may receive a user name of the certain user and a user name of the partner user in a pair.

Next, the communication level determination unit 11 refers to the user action records accumulated in the user action record accumulation unit 15 and obtains user action records corresponding to the user name of the input user (step S2).

The following describes examples of the user action records accumulated in the user action record accumulation unit 15 with reference to FIG. 3. FIG. 3 shows examples of the user action records accumulated in the user action record accumulation unit.

As shown in FIG. 3, a user action record is composed of a user, his/her partner user, an action, and time. In the examples of FIG. 3, the user action records are presented in the form of a table. In FIG. 3, "user" denotes a user who took an action, and "partner user" denotes a partner user toward whom the action was taken. Also, in FIG. 3, "action" denotes an operation performed and a response made by the user, and "time" denotes time when the action was taken. Note that " . . . " in FIG. 3 denotes omission.

For example, in FIG. 3, the second row of the table indicates that user A (user name: A) viewed a diary of user B (user name: B) on Jul. 15, 2010 at 18:20. In the case where the input reception unit 12 receives the user name of user A as the input, the communication level determination unit 11 obtains the second, third, fourth and fifth rows of the table.

Thereafter, the communication level determination unit 11 calculates user interest degrees which are degrees of an interest that the input user takes in partner users (step S3). In step S3, the communication level determination unit 11 calculates the user interest degrees based on the types of the actions that the input user took toward the partner users, the number of times the actions were taken, and the times when the actions were taken. The more the input user is interested in the partner users, the larger value the calculated user interest degrees have.

For example, provided that a user interest degree of the input user with respect to a partner user is expressed as "C (input user, partner user)", the communication level determination unit 11 can calculate a user interest degree using the following Expression 1.

$$C(\text{input user},\text{partner user})=AT(\text{input user},\text{partner user})/ATv \quad \text{(Expression 1)}$$

In the above Expression 1, "AT (input user, partner user)" denotes the number of times weighted actions were taken in a predetermined time period, that is, the number of times the input user took weighted actions toward a partner user in a predetermined time period. Note that "AT (input user, partner user)" can be calculated using the following Expression 2.

Also, in the above Expression 1, "ATv" denotes the average of the numbers of times the weighted actions were taken toward all users in the predetermined time period. In other words, "ATv" can be obtained by calculating the numbers of times the weighted actions were taken toward all users and calculating the average thereof.

$$AT(\text{input user},\text{partner user})=\Sigma(\alpha(\text{action type})\times T(\text{input user},\text{partner user},\text{action type})) \quad \text{(Expression 2)}$$

In the above Expression 2, "α (action type)" denotes a weight for each action type. Also, "T (input user, partner user, action type)" denotes the number of times the input user took actions of that action type toward a partner user in the predetermined time period.

Therefore, the user interest degree expressed by the above Expression 1 is equivalent to a ratio between the total number of times the input user took weighted actions toward a partner user in a predetermined time period and the average of the numbers of times actions were taken toward all partner users in the predetermined time period.

Also, "α (action type)" in the above Expression 2 is set for each action type. The higher the level of an action as a means of communication between users, the larger the weight for that action. For example, comparing the viewing of profile information with message transmission, the viewing of profile information is nothing but a simple act of viewing, while message transmission requires contacting a partner user. Therefore, a larger weight is given to the latter former. More specifically, three is set as the weight for message transmission, and one is set as the weight for profile viewing.

In the case of the examples of FIG. 3, T (input user, partner user, action type) in the above Expression 2 is T (user A, user B, message transmission)=1.

In the above Expressions 1 and 2, the "predetermined time period" denotes a time period that has been set in advance for determining a communication level. The "predetermined time period" may be, for example, two days. Furthermore, the "predetermined time period" may be fixed in the communication assistance device 10, or may be a time period from when a communication level was previously determined to the current time.

Note that the user interest degree calculated using the above Expressions 1 and 2 in the present Embodiment 1 is one example. In the present Embodiment 1, a user interest degree may be calculated in consideration of ease in communication with users.

For example, a user interest degree may be calculated by dividing the number of times the input user took actions toward a partner user in a predetermined time period by the number times the input user took actions toward all partner users over an entire time period. Alternatively, the user interest degree calculated using any of the aforementioned methods may be divided by the number of times the input user took weighted actions toward all partner users over an entire time period, and the value obtained through this division may be used as the user interest degree.

In the case where the user interest degrees are calculated in the above manner, if more actions are taken toward a user with whom communication can be easily conducted than other users, the user interest degree calculated with respect to that user has a large value. On the other hand, the user interest degree calculated with respect to a user with whom communication cannot be easily conducted has a large value even if fewer actions are taken toward that user.

Furthermore, a time-based weight may be applied to calculation of the user interest degrees. For example, when a long predetermined time period is set, a weight may be adjusted depending on the time when each action was taken. More specifically, a small weight may be applied to old actions, and a large weight may be applied to recent actions. Furthermore, a weight for each action may be changed in accordance with a current communication level.

The following describes the case where user interest degrees C. are calculated for the examples of FIG. 3 using the above Expressions 1 and 2. Provided that users A and B are the input user and the partner user, respectively, a user interest degree can be calculated using the following Expression 3.

$$C(\text{user }A,\text{user }B) = \{\alpha(\text{diary viewing}) \times T(\text{user }A, \text{user }B, \text{diary viewing}) + \alpha(\text{message transmission}) \times T(\text{user }A, \text{user }B, \text{message transmission})\}/ATv \quad \text{(Expression 3)}$$

Provided that α (profile viewing)=1, α (diary viewing)=2, and α (message transmission)=3, the above Expression 3 is substituted with the following Expression 4.

$$C(\text{user }A, \text{user }B) = (2 \times 1 + 3 \times 1)/ATv \quad \text{(Expression 4)}$$

ATv (the average of the numbers of times weighted actions were taken toward all users in a predetermined time period) is calculated as follows. It is assumed that users A, B and C compose all users. The following Expressions 5 through 10 show AT (input user, partner user) for the cases where different users act as the input users.

$$AT(\text{user }A, \text{user }B) = (2 \times 1 + 3 \times 1) = 5 \quad \text{(Expression 5)}$$

$$AT(\text{user }A, \text{user }C) = 1 \times 1 = 1 \quad \text{(Expression 6)}$$

$$AT(\text{user }B, \text{user }A) = 0 \quad \text{(Expression 7)}$$

$$AT(\text{user }B, \text{user }C) = 0 \quad \text{(Expression 8)}$$

$$AT(\text{user }C, \text{user }A) = 1 \times 1 = 1 \quad \text{(Expression 9)}$$

$$AT(\text{user }C, \text{user }B) = 0 \quad \text{(Expression 10)}$$

Based on the values obtained from the above Expressions 5 through 10, ATv can be calculated as shown in the following Expression 11, and C (user A, user B) can be calculated as shown in the following Expression 12.

$$ATv = (5+1+0+0+1+0)/6 = 7/6 = \text{approximately } 1.0 \quad \text{(Expression 11)}$$

$$C(\text{user }A, \text{user }B) = (2 \times 1 + 3 \times 1)/1.0 = 5.0 \quad \text{(Expression 12)}$$

Similarly, provided that users A and C are the input user and the partner user, respectively, a user interest degree C. (user A, user C) can be calculated using the following Expression 13.

$$C(\text{user }A, \text{user }C) = \{\alpha(\text{profile viewing}) \times T(\text{user }A, \text{user }B, \text{profile viewing})\}/ATv = (1 \times 1)/1.0 = 1.0 \quad \text{(Expression 13)}$$

Furthermore, provided that users B and A are the input user and the partner user, respectively, similar calculation leads to a user interest degree C. (user B, user A)=0. Furthermore, provided that users C and A are the input user and the partner user, respectively, similar calculation leads to a user interest degree C. (user C, user A)=1.0.

It is apparent from the above examples that a user interest degree tends to be higher when a higher-level communication means such as message transmission has been implemented, and also when actions have been taken a larger number of times.

Next, the communication level determination unit 11 refers to preference similarities between users accumulated in the preference similarity accumulation unit 14, and obtains preference similarities between the input user and all other users (step S4).

The following describes examples of the preference similarities accumulated in the preference similarity accumulation unit 14 with reference to FIG. 4. FIG. 4 shows examples of the preference similarities accumulated in the preference similarity accumulation unit. As shown in FIG. 4, preference similarity is composed of user 1, user 2, and preference similarity.

In the examples of FIG. 4, the preference similarities are presented in the form of a table. The preference similarities shown in FIG. 4 are similarities calculated based on preference information of users. The more similar the preferences of one user to the preferences of another user, the larger the value of the preference similarity between the users. For example, in FIG. 4, the first record (the first row) indicates that the preference similarity between user A and user B is 0.5.

For example, provided that user A is the input user, the preference similarity accumulation unit 14 obtains the first record and the second record (the first row and the second row). Note that in the present Embodiment 1, the obtainment of the preference similarities in step S4 may be performed in parallel with or prior to the calculation of the user interest degrees in step S3.

Thereafter, the communication level determination unit 11 determines a communication level based on the user interest degrees calculated in step S3 and the preference similarities obtained in step S4 (step S5). In the present Embodiment 1, the communication level determination unit 11 determines a communication level by judging whether the current communication level is in an advancing state, a stalled state, or a receding state.

More specifically, the communication level determination unit 11 refers to the communication levels accumulated in the communication level accumulation unit 13 and obtains a current communication level.

Examples of the communication levels accumulated in the communication level accumulation unit 13 are described below with reference to FIG. 5. FIG. 5 shows examples of the communication levels accumulated in the communication level accumulation unit. As shown in FIG. 5, the communication level accumulation unit 13 accumulates communication levels between two users (corresponding to user 1 and user 2 in FIG. 5) in association with the preference similarities and the user interest degrees used for determining the communication levels.

As stated earlier, communication levels represent relationships between users, and users move through different communication levels in a stepwise manner. Examples of the communication levels include (A1) to (A4) described above.

In step S5, the communication level determination unit 11 can judge whether the communication level is in the advancing state, the stalled state or the receding state in the following manner using the user interest degrees and the preference similarities between users.

For example, the communication level determination unit 11 judges that the communication level is in the advancing state when the preference similarity is equal to or greater than a first predetermined value set therefor and the user interest degree is equal to or greater than a first predetermined value set therefor. On the other hand, the communication level determination unit 11 judges that the communication level is in the receding state when the preference similarity between users is equal to or smaller than a second predetermined value set therefor or when the user interest degree is equal to or smaller than a second predetermined value set therefor. Furthermore, the communication level determination unit 11 judges that the communication level is in the stalled state when the communication level is neither in the advancing state nor in the receding state.

A communication level between user A and user B is discussed below. In the pre-update state shown in FIG. 5, the preference similarity between user A and user B is 0.5, the user interest degree (user B, user A) is 0, and the user interest degree (user A, user B) is 2. After the update, the user interest degree (user A, user B) is increased to 7 as shown in FIG. 6 which will be described later.

It is assumed that a communication level is in the advancing state when the preference similarity between users is equal to or greater than 0.5 and the user interest degrees of both users are equal to or greater than 1. It is also assumed that a communication level is in the receding state when the preference similarity between users is equal to or smaller than 0.2 and the user interest degree of one of the users is equal to or smaller than 1. It is also assumed that a communication level is in the stalled state in cases other than the above. In view of the above, in the post-update state, a communication level between user A and user B is judged to be in the stalled state. That is to say, the communication level between user A and user B does not progress from the current level, namely the candidate-for-friend level with similar preferences.

A communication level between user A and user C is discussed below. In the pre-update state shown in FIG. 5, the preference similarity between user A and user C is 0.2, the user interest degree (user A, user C) is 0, and the user interest degree (user C, user A) is 0. After the update, the preference similarity between user A and user C is increased to 0.7, the user interest degree (user A, user C) is increased to 1, and the user interest degree (user C, user A) is increased to 1 as shown in FIG. 6 which will be described later. In this case, in the post-update state, the communication level between user A and user C is judged to be in the advancing state.

As set forth above, in the present Embodiment 1, even if there is a close similarity between users, the users are first judged to be at an intermediate level instead of suddenly being judged to be at a friend level. Therefore, the relationship between the users can be cultivated.

The judgment as to whether a communication level is in the advancing state, the stalled state or the receding state may vary depending on communication levels. For example, assume that the communication levels are more specifically classified into (B1) to (B6) described above. In this case, provided that a current communication level is a stranger level, the judgment may be made as follows.

When the preference similarity between users is equal to or greater than a first predetermined value set therefor and a user interest degree of one of the users is equal to or greater than a first predetermined value set therefor, the communication level is judged to be in the advancing state. When the preference similarity between users is equal to or smaller than a second predetermined value set therefor or when a user interest degree of one of the users is equal to or smaller than a second predetermined value set therefor, the communication level is judged to be in the receding state. In cases other than the above, the communication level is judged to be in the stalled state.

When the communication levels are specifically classified, it is preferable that users move to the next level (the existence awareness level at the stranger level) if one user is interested in the other in the above manner.

On the other hand, when the current communication level is the existence awareness level at the stranger level, it is preferable to judge that the communication level is in the advancing state when the preference similarity between users is equal to or greater than a predetermined value set therefor and the user interest degrees of both users are equal to or greater than a predetermined value set therefor. In this way, when both users are interested in each other and exchange information by any means, they can move to the next level, namely the information exchange level at the stranger level.

Once step S5 has been executed in the above manner, the communication level determination unit 11 updates the determined communication level as well as the corresponding preference similarity between users and the corresponding user interest degree in the communication level accumulation unit 13 as shown in FIG. 6. FIG. 6 shows examples of the communication levels obtained as a result of updating the communication levels shown in FIG. 5. As can be seen from comparison between FIG. 5 and FIG. 6, the result of the determination, as well as the preference similarity between users and the user interest degree used for the determination, are updated with respect to user A.

As set forth above, the operations of the communication assistance device 10 allow determining a level of a relationship between users based on similarities between preference patterns of the users and records of actions taken by a user to other users. The communication assistance device 10 can provide communication assistance by determining the level in accordance with the level.

When users are at a stranger level with similar preferences and no knowledge of name, the communication assistance device 10 can instruct the service providing device 30 not to disclose the names of the users. If the communication level progresses to a candidate-for-friend level, the communication assistance device 10 allows the service providing device 30 to disclose the names of the users. Through the above processing, users can communication with one another while overcoming psychological obstacles over time.

It suffices for a program according to the present Embodiment 1 to cause a computer to execute steps S1 to S5 shown in FIG. 2. The communication assistance device 10 and the communication assistance method according to the present Embodiment 1 can be realized by installing and executing this program on the computer. In this case, a central processing unit (CPU) of the computer functions as the input reception unit 12 and the communication level determination unit 11 and executes processing thereof.

The preference similarity accumulation unit 14 is realized by the CPU and a storage device, such as a hard disk, provided in the computer. Furthermore, the communication level accumulation unit 13 and the user action record accumulation unit 15 are realized by the storage device.

Embodiment 2

Figure 7:
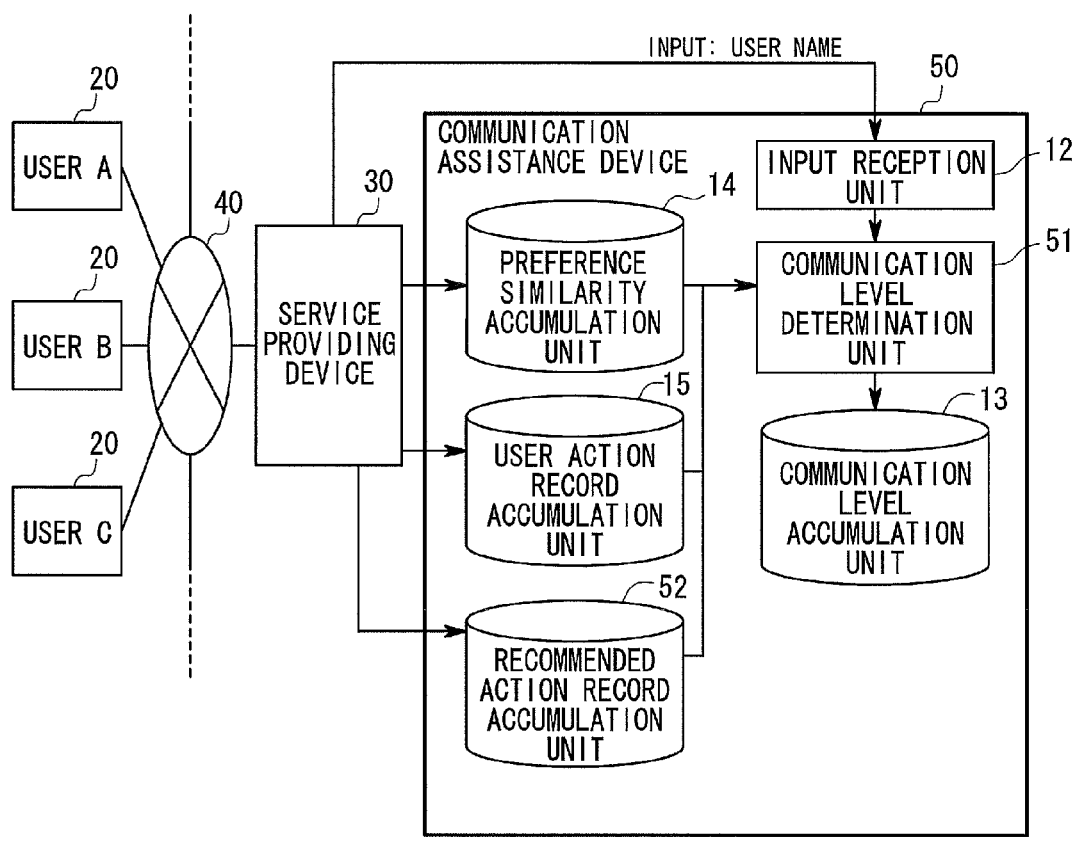
FIG. 7 is a block diagram showing a configuration of a communication assistance device according to Embodiment 2 of the present invention.
Figure 9:
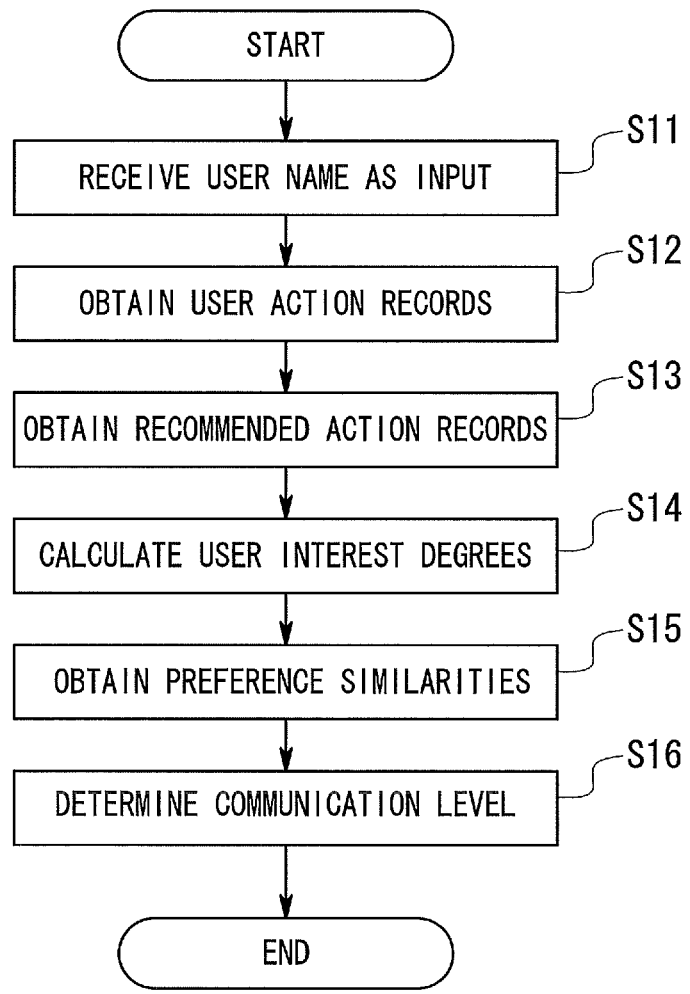
FIG. 9 is a flowchart showing the operations of the communication assistance device according to Embodiment 2 of the present invention.

The following describes a communication assistance device, a communication assistance method and a program according to Embodiment 2 of the present invention with reference to FIGS. 7 to 9. First, a description is given of a configuration of the communication assistance device according to the present Embodiment 2 with reference to FIG. 7. FIG. 7 is a block diagram showing a configuration of the communication assistance device according to Embodiment 2 of the present invention.

As shown in FIG. 7, a communication assistance device 50 according to the present Embodiment 2 differs from the communication assistance device 10 according to Embodiment 1 as follows. The communication assistance device 50 according to the present Embodiment 2 includes a communication level determination unit 51 instead of the communication level determination unit 11, and additionally includes a recommended action record accumulation unit 52. The following description is provided mainly with a focus on differences from Embodiment 1.

In the present Embodiment 2, the service providing device 30 has a function of recommending actions to users unlike Embodiment 1. The users can take the recommended actions where necessary via the terminal devices 20.

The communication level determination unit 51 receives a user name as the input, determines a communication level between an input user and a partner user, and accumulates the determined communication level in the communication level accumulation unit 13. At this time, the communication level determination unit 51 accesses the recommended action record accumulation unit 52.

More specifically, the communication level determination unit 51 first refers to the user action records accumulated in the user action record accumulation unit 15 and the recommended action records accumulated in the recommended action record accumulation unit 52. Next, the communication level determination unit 51 obtains the types and frequencies of actions that the input user took toward partner users, as well as the types and frequencies of actions that were recommended by the service providing device 30 to users. Based on the obtained types and frequencies of actions, the communication level determination unit 51 calculates user interest degrees which are degrees of an interest that the input user takes in the partner users.

In the present Embodiment 2, the recommended action record accumulation unit 52 accumulates records of actions that the service providing device 30 recommended to users. Examples of the actions that the service providing device 30 recommends to users include actions that are expected to be taken by the users to assist communication.

The following describes an example of a method used by the service providing device 30 to recommend actions to users. For example, when a user calls a certain operation, the service providing device 30 receives the called operation as the input, identifies the next action corresponding to the input, and recommends the identified action.

More specifically, when user A calls an operation for viewing a diary of user B, the service providing device 30 recommends, to user A, an action for writing a comment to the diary of user B. When user A calls an operation for storing information about which user B is significantly curious, the service providing device 30 recommends, to user A, an action for transmitting that information to user B.

FIG. 8 shows examples of the recommended action records accumulated in the recommended action record accumulation unit 52. Note that FIG. 8 shows examples of the recommended action records accumulated in the recommended action record accumulation unit.

As shown in FIG. 8, the recommended action record accumulation unit 52 accumulates a user, a partner user, a recommended action, and the time when the recommended action was taken as a recommended action record. In FIG. 8, the recommended action records are presented in the form of a table. For example, the second row of the table shown in FIG. 8 indicates that transmission of a message to user A was recommended to user B on Jul. 15, 2010 at 18:10. Note that " . . . " in FIG. 8 denotes omission.

A description is now given of the operations of the communication assistance device 50 according to Embodiment 2 of the present invention with reference to FIG. 9. FIG. 9 is a flowchart showing the operations of the communication assistance device according to Embodiment 2 of the present invention. In the following description, FIGS. 7 and 8 shall be referred to where appropriate. Note that in the present Embodiment 2, a communication assistance method is implemented by causing the communication assistance device 50 to operate. Therefore, the following description of the operations of the communication assistance device 50 applies to the communication assistance method according to the present Embodiment 2.

As shown in FIG. 9, the present Embodiment 2 largely differs from Embodiment 1 in that a step of obtaining the recommended action records is newly added and that the detail of a step of calculating user interest degrees has been changed. A specific description is provided below.

First, steps S11 and S12 are executed. Steps S11 and S12 are similar to steps S1 and S2 in FIG. 2, respectively.

Next, the communication level determination unit 51 refers to the recommended action records accumulated in the recommended action record accumulation unit 52, and obtains recommended action records corresponding to the user name input in step S11 (step S13).

For example, provided that user A is the input user, the communication level determination unit 51 obtains recommended action records corresponding to user A, namely recommended actions of the second, third, fourth and fifth rows (see FIG. 8). Note that step S13 may be executed in parallel with the obtainment of the user action records in step S12.

Thereafter, the communication level determination unit 51 calculates user interest degrees of the input user toward partner users (step S14). In the present Embodiment 2, the communication level determination unit 51 calculates the user interest degrees in step S14 using the recommended action records in addition to the types of actions that the input user took toward the partner users, the number of times the actions were taken, and the times when the actions were taken. In the present Embodiment 2 also, the more the input user is interested in partner users, the larger value the calculated user interest degrees have.

For example, in the present Embodiment 2, provided that a user interest degree of the input user with respect to a partner user is expressed as "C (input user, partner user)", the communication level determination unit 51 can calculate the user interest degree using the following Expression 14.

$$C(\text{input user,partner user}) = AT(\text{input user,partner user})/ATv + RT(\text{input user,partner user})/RTv \quad \text{(Expression 14)}$$

In the above Expression 14, "AT (input user, partner user)" denotes the number of times the input user took weighted actions toward a partner user in a predetermined time period as with Expression 1. Note that "AT (input user, partner user)" can be calculated using the above Expression 2. Furthermore, "ATv" denotes the average of the numbers of times weighted actions were taken toward all users in a predetermined time period as with Expression 1.

On the other hand, in the above Expression 14, "RT (input user, partner user)" denotes the number of times weighted recommended actions were taken in a predetermined time period, namely the number of times the input user took weighted recommended actions toward a partner user in a predetermined time period. Note that "RT (input user, partner user)" can be calculated using the following Expression 15. Furthermore, "RTv" denotes the average of the numbers of times the weighted recommended actions were taken toward all users in a predetermined time period, that is, the average of the results of calculating the numbers of times the weighted recommended actions were taken toward all users.

$$RT(\text{input user,partner user})=\Sigma(\alpha(\text{action type})\times Tr(\text{input user,partner user,action type})) \quad \text{(Expression 15)}$$

In the above Expression 15, "α (action type)" denotes a weight for each action type as with "α (action type)" in the above Expression 2. Furthermore, "Tr (input user, partner user, action type)", which can be calculated by comparing the recommended action records with the user action records, denotes the number of times the input user took recommended actions of that action type in a predetermined time period.

Therefore, as can be understood from the above Expressions 14 and 15, a user interest degree according to the present Embodiment 2 can be obtained by adding a ratio between the number of times the input user took actions toward a partner user in a predetermined time period and the corresponding average, and a ratio between the number of times the input user actually took recommended actions out of the actions recommended by the service providing device 30 and the corresponding average. Therefore, a user interest degree serves as the index showing to what extent actions were taken toward an average user and to what extent a user took recommended actions.

For example, assume the case where user interest degrees are calculated based on the recommended action records shown in FIG. 8 and the user action records shown in FIG. 3. First, referring to FIG. 3, users took the recommended actions of the third, fourth and fifth rows out of the recommended actions shown in FIG. 8 (the second, third, fourth and fifth rows). Therefore, RT (input user, partner user) can be calculated as shown in the following Expressions 16 to 18.

$$RT(\text{user }A,\text{user }B,\text{message transmission})=1 \quad \text{(Expression 16)}$$

$$RT(\text{user }A,\text{user }C,\text{profile viewing})=1 \quad \text{(Expression 17)}$$

$$RT(\text{user }C,\text{user }A,\text{profile viewing})=1 \quad \text{(Expression 18)}$$

Based on the examples of FIGS. 3 and 12, C (user A, user B) can be obtained using the following Expression 19.

$$C(\text{user }A,\text{user }B)=\{(\alpha(\text{diary viewing})\times T(\text{user }A,\text{user }B,\text{diary viewing})+\alpha(\text{message transmission})\times T(\text{user }A,\text{user }B,\text{message transmission}))\}/ATv+\{\alpha(\text{message transmission})\times Tr(\text{user }A,\text{user }B,\text{message transmission})\}/RTv \quad \text{(Expression 19)}$$

Provided that α (profile viewing)=1, α (diary viewing)=2, and α (message transmission)=3, the above Expression 19 is substituted with the following Expression 20 based on the results of the above Expressions 16, 3 and 4.

$$C(\text{user }A,\text{user }B)=(2\times1+3\times1)/ATv+(3\times1)/RTv \quad \text{(Expression 20)}$$

RTv (the average of the numbers of times the weighted recommended actions were taken toward all users in a predetermined time period) is calculated as follows. It is assumed that users A, B and C compose all users. The following Expressions 21 through 26 show RT (input user, partner user) for the cases where different users act as the input users.

$$RT(\text{user }A,\text{user }B)=3\times1=3 \quad \text{(Expression 21)}$$

$$RT(\text{user }A,\text{user }C)=1\times1=1 \quad \text{(Expression 22)}$$

$$RT(\text{user }B,\text{user }A)=0 \quad \text{(Expression 23)}$$

$$RT(\text{user }B,\text{user }C)=0 \quad \text{(Expression 24)}$$

$$RT(\text{user }C,\text{user }A)=1\times1=1 \quad \text{(Expression 25)}$$

$$RT(\text{user }C,\text{user }B)=0 \quad \text{(Expression 26)}$$

Based on the values obtained from the above Expressions 21 through 26, RTv can be calculated as shown in the following Expression 27, and C (user A, user B) can be calculated as shown in the following Expression 28 using the result of the above Expression 11.

$$RTv=(3+1+0+0+1+0)/6=5/6=\text{approximately }0.83 \quad \text{(Expression 27)}$$

$$C(\text{user }A,\text{user }B)=(2\times1+3\times1)/1.0+(3\times1)/0.83=8.6 \quad \text{(Expression 28)}$$

Similarly, provided that users A and C are the input user and the partner user, respectively, the user interest degree C. (user A, user C) can be calculated using the following Expression 29.

$$C(\text{user }A,\text{user }C)=(1\times1)/1.0+(1\times1)/0.83=2.2 \quad \text{(Expression 29)}$$

Provided that users B and A are the input user and the partner user, respectively, similar calculation leads to the user interest degree C. (user B, user A)=0. Furthermore, provided that users C and A are the input user and the partner user, respectively, similar calculation leads to the user interest degree C. (user C, user A)=2.2, which is the same as Expression 29.

As set forth above, in the present Embodiment 2, when a user takes an action corresponding to a recommended action, the user interest degree increases.

Thereafter, the communication level determination unit 51 refers to the preference similarities between users accumulated in the preference similarity accumulation unit 14, and obtains preference similarities between the input user and all other users (step S15). Step S15 is similar to step S4 of Embodiment 1 shown in FIG. 2.

The communication level determination unit 51 then determines a communication level based on the user interest degrees calculated in step S14 and the preference similarities obtained in step S15 (step S16). Step S16 is similar to step S5 of Embodiment 1 shown in FIG. 2. In the present Embodiment 2 also, after step S16 is executed, the communication level determination unit 51 updates the determined communication level as well as the corresponding preference similarity between users and the corresponding user interest degree in the communication level accumulation unit 13.

As set forth above, in the present Embodiment 2 also, the operations of the communication assistance device 50 allow determining a communication level based on similarities between preference patterns of users and records of actions taken by a user toward other users, as in Embodiment 1. The communication assistance device 50 can provide communication assistance by determining the level in accordance with the level. Furthermore, the present Embodiment 2 takes into consideration whether or not a user has followed recommended actions in determining a communication level, and therefore improves the accuracy of the determination.

It suffices for a program according to the present Embodiment 2 to cause a computer to execute steps S11 to S16 shown in FIG. 9. The communication assistance device 50 and the communication assistance method according to the present Embodiment 2 can be realized by installing and executing this program on the computer. In this case, a central processing unit (CPU) of the computer functions as the input reception unit 12 and the communication level determination unit 51 and executes processing thereof.

The preference similarity accumulation unit 14 is realized by the CPU and a storage device, such as a hard disk, provided in the computer. Furthermore, the communication level accumulation unit 13, the user action record accumulation unit 15 and the recommended action record accumulation unit 52 are realized by the storage device.

Embodiment 3

Figure 10:
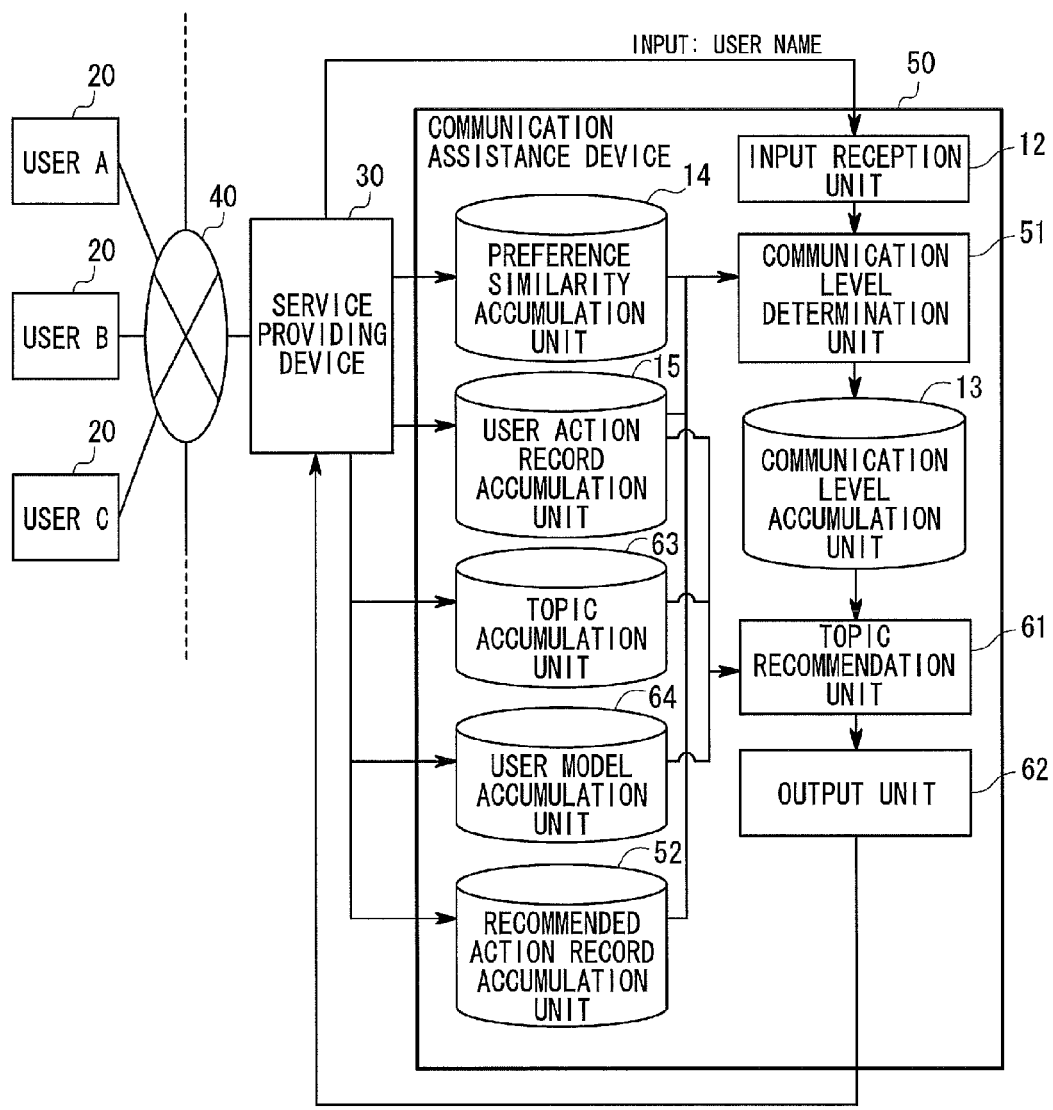
FIG. 10 is a block diagram showing a configuration of a communication assistance device according to Embodiment 3 of the present invention.

The following describes a communication assistance device, a communication assistance method and a program according to Embodiment 3 of the present invention with reference to FIGS. 10 to 14. First, a description is given of a configuration of the communication assistance device according to the present Embodiment 3 with reference to FIG. 10. FIG. 10 is a block diagram showing a configuration of the communication assistance device according to Embodiment 3 of the present invention.

As shown in FIG. 10, a communication assistance device 60 according to the present Embodiment 3 includes, in addition to the configuration of the communication assistance device 50 according to the present Embodiment 2 shown FIG. 7, a topic recommendation unit 61, a output unit 62, a topic accumulation unit 63, and user model accumulation unit 64. The following description is provided mainly with a focus on differences from Embodiment 1 and Embodiment 2.

The topic recommendation unit 61 receives, as the input, the user name input to the input reception unit 12. Based on the received user name, the topic recommendation unit 61 refers to the topics accumulated in the topic accumulation unit 63 and the user models accumulated in the user model accumulation unit 64, and searches for topics to be recommended to the input user and the partner user.

More specifically, based on the topics accumulated in the topic accumulation unit 63 and the user models accumulated in the user model accumulation unit 64, the topic recommendation unit 61 first calculates a degree of preference for each topic on a per-user basis.

Then, in order to provide communication assistance to users at various communication levels (including both the input user and the partner user), the topic recommendation unit 61 narrows the group of topics accumulated in the topic accumulation unit 63 down to topic candidates that can be transmitted to the partner user. For example, when the partner user is at a friend level, the topic candidates are topics for which at least only the partner user exhibits a high degree of preference. When the partner user is at other levels, the topic candidates are topics for which both the input user and the partner user exhibit a high degree of preference.

This is because when users are at a friend level, they know each other well, and therefore it is preferable to transmit a topic that fits at least the preferences of a partner user to the partner user for viewing purposes, even if the other user is not interested in that topic. On the other hand, when users are at other levels, their relationship is in the midst of cultivation, and therefore it is preferable to transmit a topic that fits both the preferences of a partner user and the preferences of the other user to the partner user for viewing purposes.

Thereafter, the topic recommendation unit 61 determines whether topics in which the partner user is interested out of the topic candidates should be recommended to the input user or to the partner user. For example, the topic recommendation unit 61 can select a user to whom information can be easily transmitted in consideration of the speed of transmission of information to users, namely the number of people to whom certain information can be transmitted per unit time.

More specifically, in this case, the topic recommendation unit 61 first refers to the communication levels accumulated in the communication level accumulation unit 13 and the user action records accumulated in the user action record accumulation unit 15. The topic recommendation unit 61 then identifies a user with a high user interest degree, or a user who has taken a large number of transmission actions (e.g. message transmissions) as user actions, and determines the identified user as a recommendation target.

Alternatively, in consideration of contribution to a partner user with whom communication is performed, the topic recommendation unit 61 may determine a user who has made a small contribution to a partner user, namely a user with a low user interest degree, as the recommendation target. Note that "contribution to a partner user" denotes actions taken toward the partner user, and includes transmission of information to the partner user, transmission of return comments to the partner user, and the like. Contribution to a partner user represents actions necessary to maintain a human relationship. More specifically, in the present case, the topic recommendation unit 61 refers to the communication levels accumulated in the communication level accumulation unit, identifies a user with a low user interest degree, and determines the identified user as the recommendation target.

Furthermore, the topic recommendation unit 61 may change the above criterion for determining a user to be the recommendation target depending on communication levels. For example, in the case of the existence awareness level at the stranger level with similar preferences, the topic recommendation unit 61 may determine a user with a low user interest degree as the recommendation target in consideration of contribution to a partner user. This is because the existence awareness level is the state where the partner user is interested in the determined user and it is thus necessary for the determined user to voluntarily transmit information to move to the next level, i.e. the information exchange level.

Lastly, when a large number of topics have been determined to be recommended to the input user out of the topic candidates, the topic recommendation unit 61 adjusts the amount of topics to be recommended. For example, in the case where the aim of topic recommendation is to further advance an already-progressing communication level and form a deep human relationship, the topic recommendation unit 61 adopts a large number of topics for a partner user at a more advanced communication level. On the other hand, in the case where the aim of topic recommendation is to form broad human relationships with a large number of people, the topic recommendation unit 61 adopts a large number of topics for lower communication levels.

The topic accumulation unit 63 accumulates topics that serve as a medium of communication as shown in FIG. 11. FIG. 11 shows examples of the topics accumulated in the topic accumulation unit. As shown in FIG. 11, the topic accumulation unit 63 manages each topic in association with a topic ID assigned thereto and the content thereof. In FIG. 11 a group of accumulated topics is presented in the form of a table, and " . . . " denotes omission.

The user model accumulation unit 64 accumulates information showing users' preferences, namely user models, as shown in FIG. 12. FIG. 12 shows examples of the user models accumulated in the user model accumulation unit.

As shown in FIG. 12, the user model accumulation unit 64 accumulates user models in one-to-one correspondence with users. The user models are information showing the preferences of the users. In the present Embodiment 3, the user models are information similar to preference information used to calculate the preference similarities. Here, a user model includes keywords showing the preferences of a user and weights therefor, and is expressed in the form of "keyword: weight". A plurality of keyword-weight pairs are linked together with "," between any two given pairs.

In order to provide a user with topics to be recommended, the output unit 62 outputs the topics to the service providing device 30. The output unit 62 is not only capable of outputting the topics, but also capable of outputting an action for transmitting the output topics to a communication partner. Furthermore, when outputting such an action, the output unit 62 can instruct the service providing device 30 not to display the user name of the communication partner depending on communication levels.

More specifically, at a level closer to the stranger level than to the stranger level with similar preferences and no knowledge of name, i.e. the intermediate level, the output unit 62 instructs the service providing device 30 not to display the user name of the communication partner. In this case, the output unit 62 may request the service providing device 30 to display information that substitutes the user name of the communication partner. For example, in the case where a user to whom topics are provided can read user models, the above information may be information with the largest weight out of all pieces of preference information of a partner user. Alternatively, the above information may be a keyword that has been determined to have the largest weight through analysis of topic information, or a keyword for which the largest weight has been calculated from topics and a user model of a partner user.

Figure 13:
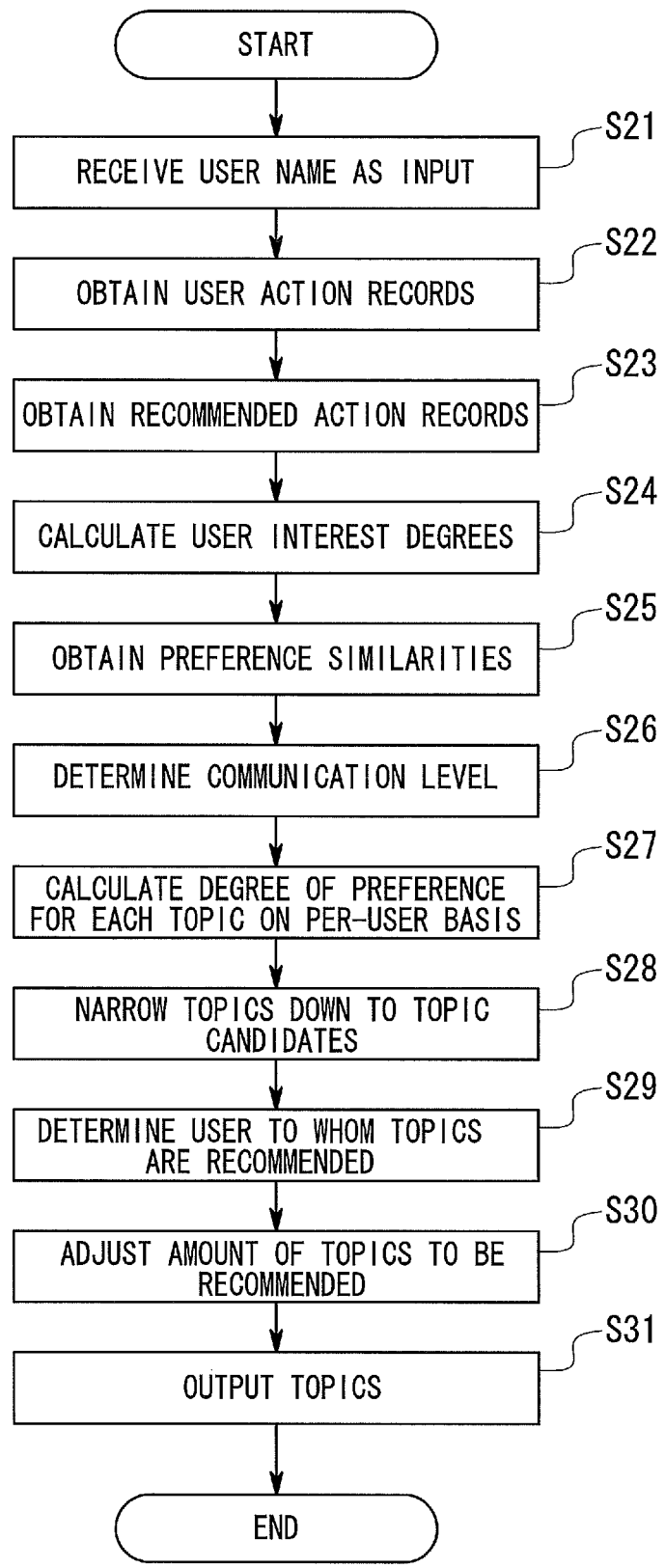
FIG. 13 is a flowchart showing the operations of the communication assistance device according to Embodiment 3 of the present invention.

A description is now given of the operations of the communication assistance device 60 according to Embodiment 3 of the present invention with reference to FIG. 13. FIG. 13 is a flowchart showing the operations of the communication assistance device according to Embodiment 3 of the present invention. In the following description, FIGS. 10 to 12 shall be referred to where appropriate. Note that in the present Embodiment 3, a communication assistance method is implemented by causing the communication assistance device 60 to operate. Therefore, the following description of the operations of the communication assistance device 60 applies to the communication assistance method according to the present Embodiment 3.

As shown in FIG. 13, the present Embodiment 3 largely differs from Embodiment 2 in that a step of recommending a topic is newly added after a step of determining a communication level. A specific description is provided below.

First, steps S21 to S26 are executed. Steps S21 to S26 are similar to steps S11 to S16 in FIG. 2 according to the Embodiment 2, respectively. As a result, a communication level is determined. The determined communication level is accumulated in the communication level accumulation unit 13.

Thereafter, the topic recommendation unit 61 calculates a degree of preference for each topic on a per-user basis based on the topics accumulated in the topic accumulation unit 63 and the user models accumulated in the user model accumulation unit 64 (step S27). Note that a degree of preference denotes a degree at which a user likes a topic. The larger the value of the degree of preference is, the more the topic matches the user's preferences.

In step S27, a known method may be used to calculate a degree of preference. For example, the topic recommendation unit 61 first refers to the user models accumulated in the user model accumulation unit 64 and generates a keyword vector of each user model. The topic recommendation unit 61 then performs language analysis on the topics accumulated in the topic accumulation unit 63 and generates a topic keyword vector from the result of the analysis. Thereafter, the topic recommendation unit 61 calculates cosine similarity between the keyword vector of each user model and the topic keyword vector as a degree of preference. At this time, the topic recommendation unit 61 calculates the degrees of preference for all pairs of user and topic.

FIG. 14 shows an example of the result of calculation of the degrees of preference. Note that FIG. 14 shows examples of the degrees of preference calculated by the topic recommendation unit. As shown in FIG. 14, a degree of preference for each topic is calculated on a per-user basis. In the example of FIG. 14, the degrees of preference are presented in the form of a table.

Next, the topic recommendation unit 61 narrows the topics down to topic candidates that can be transmitted to a partner user (step S28). As stated earlier, in step S28, the topic recommendation unit 61 selects topic candidates as follows. When a partner user is at a friend level, the topic recommendation unit 61 selects topics for which at least only the partner user exhibits a high degree of preference as topic candidates. When a partner user is at other levels, the topic recommendation unit 61 selects topics for which both the input user and the partner user exhibit a high degree of preference as topic candidates.

For example, assume that the communication levels accumulated in the communication level accumulation unit 13 are in the state shown in FIG. 6. In this case, provided that user A is the input user, the topic recommendation unit 61 selects topics for which both user A and user B exhibit a high degree of preference as topic candidates because user A and user B are not at a friend level. Note that in the present Embodiment 3, a threshold for a degree of preference serving as a basis for selection is set by the communication assistance device 60 in advance.

For example, provided that a threshold for a degree of preference is set to 0.5, topic 1 and topic 2 are selected as topic candidates from among the result of the calculation shown in FIG. 14. Similarly, the topic recommendation unit 61 selects topic 1 for which both user A and user C exhibit a high degree of preference because user A and user C are not at a friend level, either. As a result, the topics are narrowed down to "topic 1 (user B, user C)" and "topic 2 (user B)". The result of narrowing down the topics in the above manner includes the resultant topics and corresponding users. That is to say, the result of narrowing down the topics shows that topic 1 is for user B and user C who are partner users of the user A.

Regarding topics in which a partner user is interested out of the topic candidates, the topic recommendation unit 61 determines a user to whom these topics are to be recommended as a recommendation target (step S29). For example, in the present example, it is assumed that the topic recommendation unit 61 determines a user to whom information can be easily transmitted as a recommendation target in consideration of the speed of information transmission (information transmissibility). In this case, the topic recommendation unit 61 refers to the communication levels accumulated in the communication level accumulation unit 13 and the user action records accumulated in the user action record accumulation unit 15. The topic recommendation unit 61 then determines a user with a high user interest degree, or a user who has taken a large number of transmission actions (e.g. message transmissions) as user actions, as a recommendation target.

For example, regarding topic 1, it is necessary to compare user A with user B and compare user A with user C. Referring to FIG. 6, the user interest degree (user A, user B) is the highest. That is to say, user A has the highest user interest degree. Therefore, as to topic 1, user A is determined as the recommendation target. On the other hand, regarding topic 2, it is necessary to compare user A with user B. Referring to FIG. 6, the user interest degree (user A, user B) is the highest. Therefore, as to topic 2 also, user A is determined as the recommendation target.

When a large number of topics have been determined to be recommended to the input user out of the topic candidates, the topic recommendation unit 61 adjusts the amount of topics to be recommended (step S30). In the present example, it is assumed that the aim of the service providing device 30 is to form broad human relationships with a large number of people. In this case, the topic recommendation unit 61 adjusts the amount of topics to be recommended so that a larger number of topics are prepared for lower communication levels. More specifically, an upper limit is set for the number of topics for each level, so that a larger number of topics are adopted for lower communication levels. Topics are selected in order from a topic for which the input user or the partner user exhibits the highest degree of preference.

For example, assume that three is set as an upper limit for the number of topics for a low communication level, namely a stranger level, two is set as an upper limit for the number of topics for a stranger level with similar preferences and no knowledge of name, one is set as an upper limit for the number of topics for the next level, namely a candidate-for-friend level with similar preferences, and one is set as an upper limit for the number of topics for a candidate-for friend level. In this case, in the present example, topic 1 applies to both the candidate-for-friend level with similar preferences (user A, user B) and the stranger level with similar preferences and no knowledge of name (user A, user C). Therefore, topic 1 may be considered to apply to either one of these levels. On the other hand, topic 2 applies to the candidate-for-friend level with similar preferences (user A, user B). As the conditions regarding the aforementioned upper limits are satisfied, topic 1 and topic 2 are both adopted.

Thereafter, in order to provide a user with topics to be recommended, the output unit 62 outputs the topics to the service providing device 30 (step S31). In the above example, "topic 1 (user B, user C)" and "topic 2 (user B)" are output in step S31. Here, parentheses show partner users of a user who has been determined as a recommendation target. In this case, the service providing device 30 causes a display of the terminal device 20 of the user who has been determined as the recommendation target to display the topics and the user names of the partner users.

When outputting topics, the output unit 62 can also instruct the service providing device 30 to recommend an action for transmitting the output topics to the partner users. At this time, when a communication level between the recommendation target to whom the topics are output and his/her partner user is closer to the stranger level than to the stranger level with similar preferences and no knowledge of name, the output unit 62 instructs the service providing device 30 not to display the user name of the partner user.

Figure 15:
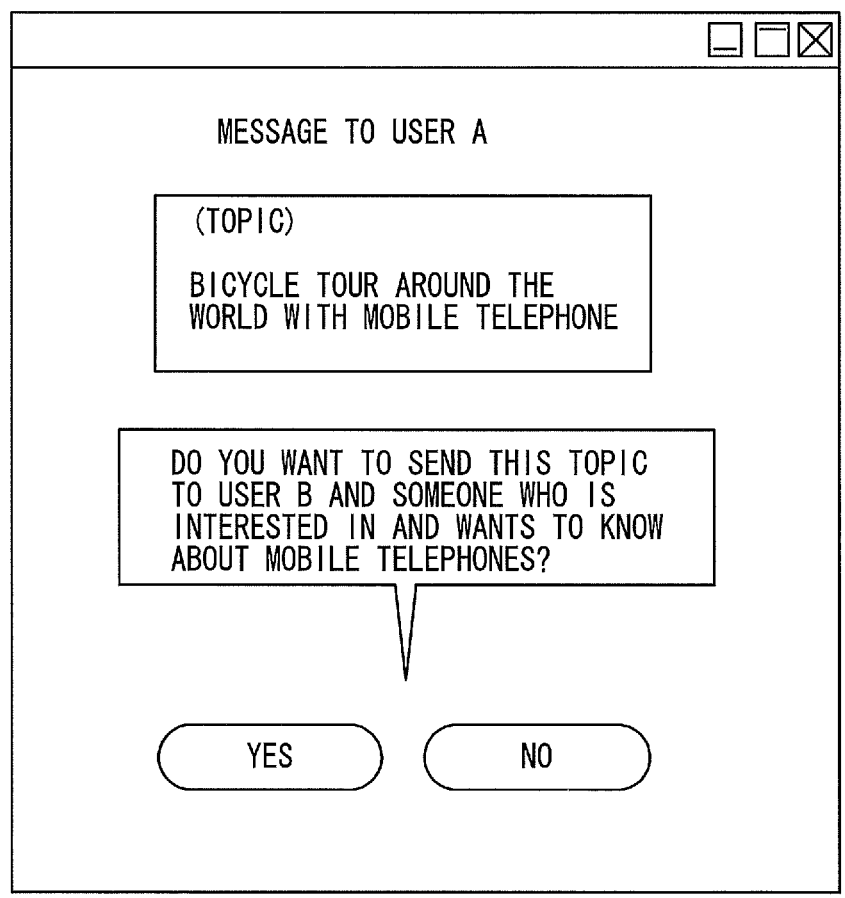
FIG. 15 shows an example of the output displayed on a display of a terminal device of a user.

The following describes an example of the output displayed on the display of the terminal device 20 of a user with reference to FIG. 15. FIG. 15 shows an example of the output displayed on the display of the terminal device of a user. Topic 1 (see FIG. 11) includes user C at a stranger level with similar preferences and no knowledge of name. Therefore, the user name of user C is not disclosed on the display of the terminal device of user A as shown in FIG. 15. Instead, user C is displayed as "someone who is interested in and wants to know about mobile telephones". Note that the keyword "mobile telephones" is adopted because it is included in both the user model of user C and the content of topic 1.

As set forth above, with the communication assistance device 60 according to the Embodiment 3, the users are given a chance to communicate with other users. As a result, communication is facilitated. Furthermore, when the communication level is an initial level, namely non-advanced communication level, the user can hide own name and communicate with other users. As a result, user easily overcome psychological obstacles, communication is facilitated in this regard.

It suffices for a program according to the present Embodiment 3 to cause a computer to execute steps S21 to S31 shown in FIG. 13. The communication assistance device 60 and the communication assistance method according to the present Embodiment 3 can be realized by installing and executing this program on the computer. In this case, a central processing unit (CPU) of the computer functions as the input reception unit 12, the communication level determination unit 51, the topic recommendation unit 61, and the output unit 62 and executes processing thereof.

The preference similarity accumulation unit 14 is realized by the CPU and a storage device, such as a hard disk, provided in the computer. Furthermore, the communication level accumulation unit 13, the user action record accumulation unit 15, the recommended action record accumulation unit 52, the topic accumulation unit 63 and the user model accumulation unit 64 are realized by the storage device.

Figure 16:
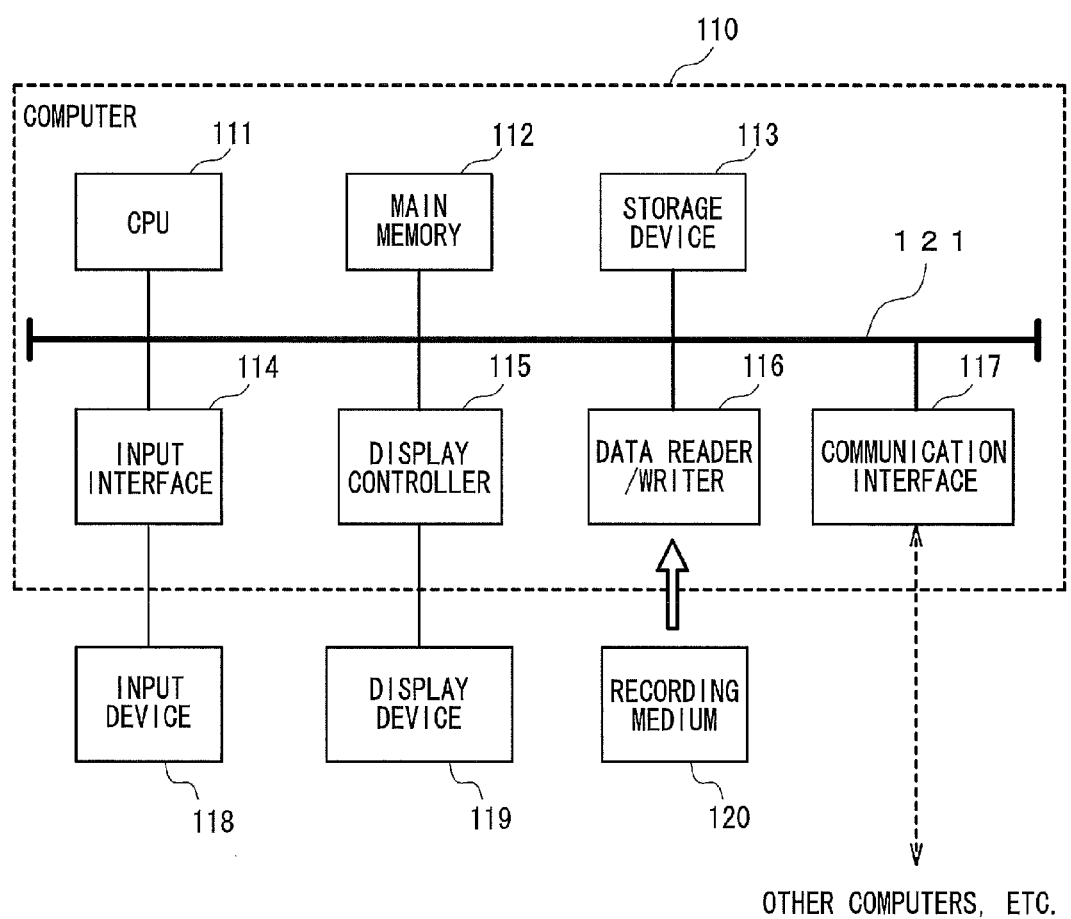
FIG. 16 is a block diagram showing an example of a computer that realizes the communication assistance devices according to Embodiment 1, Embodiment 2 and Embodiment 3 of the present invention.

With reference to FIG. 16, the following describes a computer that realizes a communication device by executing the programs according to Embodiment 1, Embodiment 2 and Embodiment 3. FIG. 16 is a block diagram showing an example of a computer that realizes the communication assistance devices according to Embodiment 1, Embodiment 2 and Embodiment 3 of the present invention.

As shown in FIG. 14, a computer 110 includes a CPU 111, a main memory 112, a storage device 113, an input interface 114, a display controller 115, a data reader/writer 116, and a communication interface 117. These components are connected by a bus 121 in such a manner that they can perform data communication with one another.

The CPU 111 performs various types of arithmetic operations by deploying programs (codes) of the embodiments stored in the storage device 113 to the main memory 112 and executing the deployed programs in a predetermined order. The main memory 112 is typically a volatile storage device such as a dynamic random-access memory (DRAM). The programs of the embodiments are provided while being stored in a computer-readable recording medium 120. The programs of the embodiments may be distributed over the Internet connected via the communication interface 117.

Specific examples of the storage device 113 include a hard disk and a semiconductor storage device such as a flash memory. The input interface 114 mediates data transmission between the CPU 111 and an input device 118 such as a keyboard and a mouse. The display controller 115 is connected to the display device 119 and controls display on the display device 119. The data reader/writer 116 mediates data transmission between the CPU 111 and the recording medium 120. More specifically, the data reader/writer 116 reads programs from the recording medium 120 and writes the results of processing executed by the computer 110 to the recording medium 120. The communication interface 117 mediates data transmission between the CPU 111 and other computers.

Specific examples of the recording medium 120 include a general-purpose semiconductor storage device such as a CompactFlash (CF) and a Secure Digital (SD), a magnetic storage medium such as a flexible disk, and an optical storage medium such as a Compact Disc read-only memory (CD-ROM). Note that in Embodiment 1, Embodiment 2 and Embodiment 3, the computer 110 may be a server computer that constitutes the service providing device 30, or may be another computer.

A part or all of the above embodiments can be described as, but are not limited to, the following Notes 1 to 27.

(Note 1)

A communication assistance device including:

a communication level determination unit that determines a level of a relationship between users based on similarity between the users and on user action records, the similarity between the users being obtained from preference information showing preferences of the users, and the user action records showing records of actions taken by a certain user toward a partner user with whom the certain user communicates out of the users.

(Note 2)

The communication assistance device according to Note 1, wherein the communication level determination unit determines whether the relationship between the users is at a stranger level, at an intermediate level between strangers and friends, or at a friend level.

(Note 3)

The communication assistance device according to Note 2, wherein the intermediate level includes at least one of a stranger level with similar preferences and no knowledge of name, at which the certain user is similar to the partner user in preferences but is not interested in the partner user; and a candidate-for-friend level with similar preferences, at which the certain user is similar to the partner user in preferences and is interested in the partner user, and when determining that the relationship between the users is at the intermediate level, the communication level determination unit determines whether the relationship between the users is at the stranger level with similar preferences and no knowledge of name or at the candidate-for-friend level with similar preferences.

(Note 4)

The communication assistance device according to Note 3, wherein the stranger level with similar preferences and no knowledge of name and the candidate-for-friend level with similar preferences are each classified into: an existence awareness level at which the existence of the partner user is acknowledged; and an information exchange level at which information is exchanged with the partner user, and when determining that the relationship between the users is at the intermediate level, the communication level determination unit determines whether the relationship between the users is at the existence awareness level of the stranger level with similar preferences and no knowledge of name, at the information exchange level of the stranger level with similar preferences and no knowledge of name, at the existence awareness level of the candidate-for-friend level with similar preferences, or at the information exchange level of the candidate-for-friend level with similar preferences.

(Note 5)

The communication assistance device according to any of Notes 1 to 4, wherein the communication level determination unit identifies, from the user action records, details of actions that have been taken by the certain user toward the partner user and the number of times the actions have been taken in a preset time period, calculates a degree of interest that the certain user takes in the partner user based on the identified details of the actions and the identified number of times the actions have been taken, and judges whether the relationship between the users is in an advancing state, in a stalled state, or in a receding state based on the similarity between the users and the degree of interest taken in the partner user, and determines the level of the relationship between the users using a result of the judgment.

(Note 6)

The communication assistance device according to any of Notes 1 to 5, wherein the communication level determination unit judges that the relationship between the users is in the advancing state when the similarity between the users is equal to or greater than a first predetermined value set therefor and the degree of interest taken in the partner user is equal to or greater than a first predetermined value set therefor, and judges that the relationship between the users is in the receding state when the similarity between the users is equal to or smaller than a second predetermined value set therefor or when the degree of interest taken in the partner user is equal to or smaller than a second predetermined value set therefor.

(Note 7)

The communication assistance device according to any of Notes 1 to 6, wherein in a case where an external device recommends actions to each user and each user takes the recommended actions, the communication level determination unit identifies, from the user action records, details of actions that have been taken by the certain user toward the partner user in a preset time period, the number of times the actions have been taken, details of the recommended actions taken by the certain user, and the number of times the recommended actions have been taken, calculates a degree of interest that the certain user takes in the partner user based on the identified details of the actions, the identified number of times the actions have been taken, the identified details of the recommended actions, and the identified number of times the recommended actions have been taken, and judges whether the relationship between the users is in an advancing state, in a stalled state, or in a receding state based on the similarity between the users and the degree of interest taken in the partner user, and determines the level of the relationship between the users using a result of the judgment.

(Note 8)

The communication assistance device according to any of Notes 1 to 7, further includes a topic recommendation unit that selects, from among a group of topics that have been prepared in advance, a topic that can be transmitted to the partner user based on the level of the relationship between the users determined by the communication level determination unit and on preferences of the certain user and the partner user.

(Note 9)

The communication assistance device according to Notes 8, wherein the topic recommendation unit calculates degrees of preference for each topic included among the group of topics on a per-user basis, and selects, as the topic that can be transmitted to the partner user, a topic for which only the partner user exhibits a degree of preference equal to or greater than a set value, or a topic for which both the certain user and the partner user exhibit a degree of preference equal to or greater than the set value, based on the level of the relationship between the users determined by the communication level determination unit and on the degrees of preference calculated on the per-user basis, determines a recommendation target user to whom the selected topic is to be recommended out of the certain user and the partner user based on information transmissibility of the certain user and the partner user or on contribution that the certain user and the partner user make to each other, and further determines the number of topics to be recommended to the recommendation target user in accordance with the level of the relationship between the users.

(Note 10)

A communication assistance method including:

a communication level determination step of determining a level of a relationship between users based on similarity between the users and on user action records, the similarity between the users being obtained from preference information showing preferences of the users, and the user action records showing records of actions taken by a certain user toward a partner user with whom the certain user communicates out of the users.

(Note 11)

The communication assistance method according to Note 10, wherein the communication level determination step determines whether the relationship between the users is at a stranger level, at an intermediate level between strangers and friends, or at a friend level.

(Note 12)

The communication assistance method according to Note 11, wherein the intermediate level includes at least one of a stranger level with similar preferences and no knowledge of name, at which the certain user is similar to the partner user in preferences but is not interested in the partner user; and a candidate-for-friend level with similar preferences, at which the certain user is similar to the partner user in preferences and is interested in the partner user, and when determining that the relationship between the users is at the intermediate level, the communication level determination step determines whether the relationship between the users is at the stranger level with similar preferences and no knowledge of name or at the candidate-for-friend level with similar preferences.

(Note 13)

The communication assistance method according to Note 12, wherein the stranger level with similar preferences and no knowledge of name and the candidate-for-friend level with similar preferences are each classified into: an existence awareness level at which the existence of the partner user is acknowledged; and an information exchange level at which information is exchanged with the partner user, and when determining that the relationship between the users is at the intermediate level, the communication level determination step determines whether the relationship between the users is at the existence awareness level of the stranger level with similar preferences and no knowledge of name, at the information exchange level of the stranger level with similar preferences and no knowledge of name, at the existence awareness level of the candidate-for-friend level with similar preferences, or at the information exchange level of the candidate-for-friend level with similar preferences.

(Note 14)

The communication assistance method according to any of Notes 10 to 13, wherein the communication level determination step identifies, from the user action records, details of actions that have been taken by the certain user toward the partner user and the number of times the actions have been taken in a preset time period, calculates a degree of interest that the certain user takes in the partner user based on the identified details of the actions and the identified number of times the actions have been taken, and judges whether the relationship between the users is in an advancing state, in a stalled state, or in a receding state based on the similarity between the users and the degree of interest taken in the partner user, and determines the level of the relationship between the users using a result of the judgment.

(Note 15)

The communication assistance method according to any of Notes 10 to 14, wherein the communication level determination step judges that the relationship between the users is in the advancing state when the similarity between the users is equal to or greater than a first predetermined value set therefor and the degree of interest taken in the partner user is equal to or greater than a first predetermined value set therefor, and judges that the relationship between the users is in the receding state when the similarity between the users is equal to or smaller than a second predetermined value set therefor or when the degree of interest taken in the partner user is equal to or smaller than a second predetermined value set therefor.

(Note 16)

The communication assistance method according to any of Notes 10 to 15, wherein in a case where an external device recommends actions to each user and each user takes the recommended actions, the communication level determination step identifies, from the user action records, details of actions that have been taken by the certain user toward the partner user in a preset time period, the number of times the actions have been taken, details of the recommended actions taken by the certain user, and the number of times the recommended actions have been taken, calculates a degree of interest that the certain user takes in the partner user based on the identified details of the actions, the identified number of times the actions have been taken, the identified details of the recommended actions, and the identified number of times the recommended actions have been taken, and judges whether the relationship between the users is in an advancing state, in a stalled state, or in a receding state based on the similarity between the users and the degree of interest taken in the partner user, and determines the level of the relationship between the users using a result of the judgment.

(Note 17)

The communication assistance method according to any of Notes 10 to 16, further includes a topic recommendation step of selecting, from among a group of topics that have been prepared in advance, a topic that can be transmitted to the partner user based on the level of the relationship between the users determined in the communication level determination step and on preferences of the certain user and the partner user.

(Note 18)

The communication assistance method according to Note 17, wherein the topic recommendation step calculates degrees of preference for each topic included among the group of topics on a per-user basis, and selects, as the topic that can be transmitted to the partner user, a topic for which only the partner user exhibits a degree of preference equal to or greater than a set value, or a topic for which both the certain user and the partner user exhibit a degree of preference equal to or greater than the set value, based on the level of the relationship between the users determined by the communication level determination step and on the degrees of preference calculated on the per-user basis, determines a recommendation target user to whom the selected topic is to be recommended out of the certain user and the partner user based on information transmissibility of the certain user and the partner user or on contribution that the certain user and the partner user make to each other, and further determines the number of topics to be recommended to the recommendation target user in accordance with the level of the relationship between the users.

(Note 19)

A computer-readable recording medium having recorded therein a program including instructions for causing a computer to execute:

a communication level determination step of determining a level of a relationship between users based on similarity between the users and on user action records, the similarity between the users being obtained from preference information showing preferences of the users, and the user action records showing records of actions taken by a certain user toward a partner user with whom the certain user communicates out of the users.

(Note 20)

The computer-readable recording medium according to Note 19, wherein the communication level determination step determines whether the relationship between the users is at a stranger level, at an intermediate level between strangers and friends, or at a friend level.

(Note 21)

The computer-readable recording medium according to Note 20, wherein the intermediate level includes at least one of a stranger level with similar preferences and no knowledge of name, at which the certain user is similar to the partner user in preferences but is not interested in the partner user; and a candidate-for-friend level with similar preferences, at which the certain user is similar to the partner user in preferences and is interested in the partner user, and when determining that the relationship between the users is at the intermediate level, the communication level determination step determines whether the relationship between the users is at the stranger level with similar preferences and no knowledge of name or at the candidate-for-friend level with similar preferences.

(Note 22)

The computer-readable recording medium according to Note 21, wherein the stranger level with similar preferences and no knowledge of name and the candidate-for-friend level with similar preferences are each classified into: an existence awareness level at which the existence of the partner user is acknowledged; and an information exchange level at which information is exchanged with the partner user, and when determining that the relationship between the users is at the intermediate level, the communication level determination step determines whether the relationship between the users is at the existence awareness level of the stranger level with similar preferences and no knowledge of name, at the information exchange level of the stranger level with similar preferences and no knowledge of name, at the existence awareness level of the candidate-for-friend level with similar preferences, or at the information exchange level of the candidate-for-friend level with similar preferences.

(Note 23)

The computer-readable recording medium according to any of Notes 19 to 22, wherein the communication level determination step identifies, from the user action records, details of actions that have been taken by the certain user toward the partner user and the number of times the actions have been taken in a preset time period, calculates a degree of interest that the certain user takes in the partner user based on the identified details of the actions and the identified number of times the actions have been taken, and judges whether the relationship between the users is in an advancing state, in a stalled state, or in a receding state based on the similarity between the users and the degree of interest taken in the partner user, and determines the level of the relationship between the users using a result of the judgment.

(Note 24)

The computer-readable recording medium according to any of Notes 19 to 23, wherein the communication level determination step judges that the relationship between the users is in the advancing state when the similarity between the users is equal to or greater than a first predetermined value set therefor and the degree of interest taken in the partner user is equal to or greater than a first predetermined value set therefor, and judges that the relationship between the users is in the receding state when the similarity between the users is equal to or smaller than a second predetermined value set therefor or when the degree of interest taken in the partner user is equal to or smaller than a second predetermined value set therefor.

(Note 25)

The computer-readable recording medium according to any of Notes 19 to 24, wherein in a case where an external device recommends actions to each user and each user takes the recommended actions, the communication level determination step identifies, from the user action records, details of actions that have been taken by the certain user toward the partner user in a preset time period, the number of times the actions have been taken, details of the recommended actions taken by the certain user, and the number of times the recommended actions have been taken, calculates a degree of interest that the certain user takes in the partner user based on the identified details of the actions, the identified number of times the actions have been taken, the identified details of the recommended actions, and the identified number of times the recommended actions have been taken, and judges whether the relationship between the users is in an advancing state, in a stalled state, or in a receding state based on the similarity between the users and the degree of interest taken in the partner user, and determines the level of the relationship between the users using a result of the judgment.

(Note 26)

In the computer-readable recording medium according to any of Notes 19 to 25, the program further includes a topic recommendation step of selecting, from among a group of topics that have been prepared in advance, a topic that can be transmitted to the partner user based on the level of the relationship between the users determined in the communication level determination step and on preferences of the certain user and the partner user.

(Note 27)

The computer-readable recording medium according to Note 26, wherein the topic recommendation step calculates degrees of preference for each topic included among the group of topics on a per-user basis, and selects, as the topic that can be transmitted to the partner user, a topic for which only the partner user exhibits a degree of preference equal to or greater than a set value, or a topic for which both the certain user and the partner user exhibit a degree of preference equal to or greater than the set value, based on the level of the relationship between the users determined by the communication level determination step and on the degrees of preference calculated on the per-user basis, determines a recommendation target user to whom the selected topic is to be recommended out of the certain user and the partner user based on information transmissibility of the certain user and the partner user or on contribution that the certain user and the partner user make to each other, and further determines the number of topics to be recommended to the recommendation target user in accordance with the level of the relationship between the users.

Although the invention of the present application has been described using the above embodiments, the invention of the present application is by no means limited to the above embodiments. The configurations and details of the invention of the present application may be subjected to various changes that can be understood by a person skilled in the art within a scope of the invention of the present application.

The present application claims the benefit of priority from Japanese Patent Application No. 2010-177374, filed Aug. 6, 2010, the disclosure of which is incorporated herein by reference in its entirety.

INDUSTRIAL APPLICABILITY

As set forth above, the present invention allows determining a level of a relationship between users who communicate with each other. Therefore, the present invention can be applied to, for example, a conversation assistance device that recommends a conversation partner, and a program for realizing the conversation assistance device using a computer.

REFERENCE SIGNS LIST

10 COMMUNICATION ASSISTANCE DEVICE (EMBODIMENT 1)
11 COMMUNICATION LEVEL DETERMINATION UNIT
12 INPUT RECEPTION UNIT
13 COMMUNICATION LEVEL ACCUMULATION UNIT
14 PREFERENCE SIMILARITY ACCUMULATION UNIT
15 USER ACTION RECORD ACCUMULATION UNIT
20 TERMINAL DEVICE
30 SERVICE PROVIDING DEVICE
40 NETWORK
50 COMMUNICATION ASSISTANCE DEVICE (EMBODIMENT 2)
51 COMMUNICATION LEVEL DETERMINATION UNIT
52 RECOMMENDED ACTION RECORD ACCUMULATION UNIT
60 COMMUNICATION ASSISTANCE DEVICE (EMBODIMENT 3)
61 TOPIC RECOMMENDATION UNIT
62 OUTPUT UNIT
63 TOPIC ACCUMULATION UNIT
64 USER MODEL ACCUMULATION UNIT
110 COMPUTER
111 CPU
112 MAIN MEMORY
113 STORAGE DEVICE
114 INPUT INTERFACE
115 DISPLAY CONTROLLER
116 DATA READER/WRITER
117 COMMUNICATION INTERFACE
118 INPUT DEVICE
119 DISPLAY DEVICE
120 RECORDING MEDIUM
121 BUS

What is claimed is:

1. A communication assistance device comprising:
an input terminal for receiving preference information comprising preferences of a plurality of users;
a processor communicatively coupled to a network, wherein the processor is configured to:
determine a similarity among the plurality of users based on the preferences of the plurality of users;
identify, from user action records, details of actions that have been taken by a certain user toward a partner user;
identify, from user action records, a number of times the actions have been performed during a time period;
calculate a degree of interest that the user takes in the partner user based on the actions and the number of times the actions have been performed in accordance with the formula C (input user, partner user)=AT (input user, partner user)/ATv;
determine, based on the similarity and the degree of interest, that a state of a relationship between the certain user and the partner user is one of at least an advancing state, a stalled state, and a receding state; and
determine a level of the relationship between users based on the similarity between the users, user action records, and the state of the relationship, wherein the user action records show records of actions taken by a certain user toward a partner user.

2. The communication assistance device according to claim 1, wherein the processor is further configured to:
determine whether the level of the relationship between the users is at a stranger level, at an intermediate level between strangers and friends, or at a friend level.

3. The communication assistance device according to claim 2, wherein the intermediate level comprises at least one of: a stranger level with similar preferences and no knowledge of name, which indicates that the certain user is similar to the partner user in preferences but is not interested in the partner user; and a candidate-for-friend level with similar preferences, which indicates that the certain user is similar to the partner user in preferences and is interested in the partner user; and
if the relationship between the users is at the intermediate level, determine whether the level of the relationship between the users is at the stranger level with similar preferences and no knowledge of name or at the candidate-for-friend level with similar preferences.

4. The communication assistance device according to claim 1, wherein the processor is further configured to:
   determine that a state of the relationship between the users is in the advancing state if the similarity between the users is equal to or greater than a first predetermined value set therefor and the degree of interest taken in the partner user is equal to or greater than a first predetermined value; and
   determine that the state of the relationship between the users is in the receding state if the similarity between the users is equal to or smaller than a second predetermined value or when the degree of interest taken in the partner user is equal to or smaller than the second predetermined value.

5. The communication assistance device according to claim 1, wherein the processor is further configured to:
   receive recommendations for actions to each user from an external device communicatively coupled to the network;
   identify, from the user action records, details of actions that have been taken by the certain user toward the partner user in a preset time period, the number of times the actions have been taken, details of the recommended actions taken by the certain user, and the number of times the recommended actions have been taken,
   calculate a degree of interest that the certain user takes in the partner user based on the identified details of the actions, the identified number of times the actions have been taken, the identified details of the recommended actions, and the identified number of times the recommended actions have been taken;
   determine whether a state of the relationship between the users is in an advancing state, in a stalled state, or in a receding state based on the similarity between the users and the degree of interest taken in the partner user; and
   determine the level of the relationship between the users based on the state of the relationship.

6. The communication assistance device according to claim 1, wherein the processor is further configured to:
   select, from among a group of topics that have been prepared in advance, a selected topic that can be transmitted to the partner user based on the level of the relationship between the users and on preferences of the certain user and the partner user.

7. The communication assistance device according to claim 6, wherein the processor is further configured to:
   calculate degrees of preference for each topic included among the group of topics on a per-user basis;
   select, as the topic that can be transmitted to the partner user, a first selected topic for which only the partner user exhibits a degree of preference equal to or greater than a set value, or a second selected topic for which both the certain user and the partner user exhibit a degree of preference equal to or greater than the set value, based on the level of the relationship between the users and on the degrees of preference calculated on the per-user basis;
   determine a recommendation target user to whom the first or the second selected topic is to be recommended out of the certain user and the partner user based on information transmissibility of the certain user and the partner user or on contribution that the certain user and the partner user make to each other; and
   determine the number of topics to be recommended to the recommendation target user in accordance with the level of the relationship between the users.

8. A communication assistance method comprising:
   determining a similarity among a plurality of users based on preferences of the plurality of users;
   identifying, from user action records, details of actions that have been taken by a certain user toward a partner user;
   identifying, from user action records, a number of times the actions have been performed during a time period;
   calculate a degree of interest that the user takes in the partner user based on the actions and the number of times the actions have been performed in accordance with the formula C (input user, partner user)=AT (input user, partner user)/ATv;
   determining, based on the similarity and the degree of interest, that a state of a relationship between the certain user and the partner user is one of at least an advancing state, a stalled state, and a receding state; and
   determining a level of the relationship between users based on the similarity between the users, on user action records, and the state of the relationship, wherein the user action records show records of actions taken by a certain user toward a partner user.

9. A non-transitory computer-readable recording medium having recorded therein a program including instructions for causing a computer to:
   determine a similarity among a plurality of users based on preferences of the plurality of users;
   identify, from user action records, details of actions that have been taken by a certain user toward a partner user;
   identify, from user action records, a number of times the actions have been performed during a time period;
   calculate a degree of interest that the user takes in the partner user based on the actions and the number of times the actions have been performed in accordance with the formula C (input user, partner user)=AT (input user, partner user)/ATv;
   determine, based on the similarity and the degree of interest, that a state of a relationship between the certain user and the partner user is one of at least an advancing state, a stalled state, and a receding state; and
   determine a level of the relationship users based on the similarity between the users, on user action records, and the state of the relationship, wherein the user action records show records of actions taken by a certain user toward a partner user.

10. The communication assistance device according to claim 3, wherein
   the stranger level with similar preferences and no knowledge of name and the candidate-for-friend level with similar preferences are each classified into: an existence awareness level at which the existence of the partner user is acknowledged, and an information exchange level at which information is exchanged with the partner user, and
   wherein, if the relationship between the users is at the intermediate level, the processor is further configured to determine whether the relationship between the users is at the existence awareness level of the stranger level with similar preferences and no knowledge of name, at the information exchange level of the stranger level with similar preferences and no knowledge of name, at the existence awareness level of the candidate-for-friend level with similar preferences, or at the information exchange level of the candidate-for-friend level with similar preferences.

11. The communication assistance method according to claim 8, wherein determining the level of the relationship comprises determining whether the level of the relationship between the users is at a stranger level, at an intermediate level between strangers and friends, or at a friend level.

12. The communication assistance method according to claim 11, wherein the intermediate level comprises at least one of: a stranger level with similar preferences and no knowledge of name, which indicates that the certain user is similar to the partner user in preferences but is not interested in the partner user, and a candidate-for-friend level with similar preferences, which indicates that the certain user is similar to the partner user in preferences and is interested in the partner user; and if the level of the relationship between the users is at the intermediate level, determining whether the level of the relationship between the users is at the stranger level with similar preferences and no knowledge of name or at the candidate-for-friend level with similar preferences.

13. The communication assistance method according to claim 12, wherein the stranger level with similar preferences and no knowledge of name and the candidate-for-friend level with similar preferences are each classified into: an existence awareness level at which the existence of the partner user is acknowledged; and an information exchange level at which information is exchanged with the partner user, and wherein, if the relationship between the users is at the intermediate level, the communication assistance method further comprises determining whether the relationship between the users is at the existence awareness level of the stranger level with similar preferences and no knowledge of name, at the information exchange level of the stranger level with similar preferences and no knowledge of name, at the existence awareness level of the candidate-for-friend level with similar preferences, or at the information exchange level of the candidate-for-friend level with similar preferences.

14. The communication assistance method according to claim 8, further comprising:

determining that the relationship between the users is in the advancing state if the similarity between the users is equal to or greater than a first predetermined value and the degree of interest taken in the partner user is equal to or greater than a first predetermined value, and determining that the state of the relationship between the users is in the receding state if the similarity between the users is equal to or smaller than a second predetermined value or when the degree of interest taken in the partner user is equal to or smaller than a second predetermined value.

15. The communication assistance method according to claim 8, further comprising:

receiving recommendations for actions to each user;

identifying, from the user action records, details of actions that have been taken by the certain user toward the partner user in a preset time period, the number of times the actions have been taken, details of the recommended actions taken by the certain user, and the number of times the recommended actions have been taken, calculating a degree of interest that the certain user takes in the partner user based on the identified details of the actions, the identified number of times the actions have been taken, the identified details of the recommended actions, and the identified number of times the recommended actions have been taken;

determining whether the state of the relationship between the users is in an advancing state, in a stalled state, or in a receding state based on the similarity between the users and the degree of interest taken in the partner user; and determining the level of the relationship between the users based on the state of the relationship.

16. The communication assistance method according to claim 8, further comprising:

selecting, from among a group of topics that have been prepared in advance, a topic that can be transmitted to the partner user based on the level of the relationship between the users and on preferences of the certain user and the partner user.

17. The communication assistance method according to claim 16, further comprising:

calculating degrees of preference for each topic included among the group of topics on a per-user basis;

selecting, as the topic that can be transmitted to the partner user, a first selected topic for which only the partner user exhibits a degree of preference equal to or greater than a set value, or a second selected topic for which both the certain user and the partner user exhibit a degree of preference equal to or greater than the set value, based on the level of the relationship between the users determined by the communication level determination step and on the degrees of preference calculated on the per-user basis;

determining a recommendation target user to whom the first or the second selected topic is to be recommended out of the certain user and the partner user based on information transmissibility of the certain user and the partner user or on contribution that the certain user and the partner user make to each other; and determining the number of topics to be recommended to the recommendation target user in accordance with the level of the relationship between the users.

18. The computer-readable recording medium according to claim 9, wherein the computer is further caused to:

determine whether the level of the relationship between the users is at a stranger level, at an intermediate level between strangers and friends, or at a friend level.

19. The computer-readable recording medium according to claim 18, wherein the intermediate level comprises at least one of: a stranger level with similar preferences and no knowledge of name, which indicates that the certain user is similar to the partner user in preferences but is not interested in the partner user, and a candidate-for-friend level with similar preferences, which indicates that the certain user is similar to the partner user in preferences and is interested in the partner user; and wherein, if the level of the relationship between the users is at the intermediate level, the computer is further caused to determine whether the level of the relationship between the users is at the stranger level with similar preferences and no knowledge of name or at the candidate-for-friend level with similar preferences.

20. The computer-readable recording medium according to claim 19, wherein the stranger level with similar preferences and no knowledge of name and the candidate-for-friend level with similar preferences are each classified into: an existence awareness level at which the existence of the partner user is acknowledged; and an information exchange level at which information is exchanged with the partner user, and wherein, if the level of the relationship between the users is at the intermediate level, the computer is further caused to determine whether the level of the relationship between the users is at the existence awareness level of the stranger level with similar preferences and no knowledge of name, at the information exchange level of the stranger level with similar preferences and no knowledge of name, at the existence awareness level of the candidate-for-friend level with similar preferences, or at the information exchange level of the candidate-for-friend level with similar preferences.

21. The computer-readable recording medium according to claim 9, wherein the computer is further caused to:
determine that a state of the relationship between the users is in the advancing state if the similarity between the users is equal to or greater than a first predetermined value set therefor and the degree of interest taken in the partner user is equal to or greater than a first predetermined value; and
determine that the state of the relationship between the users is in the receding state if the similarity between the users is equal to or smaller than a second predetermined value or when the degree of interest taken in the partner user is equal to or smaller than the second predetermined value.

22. The computer-readable recording medium according to claim 9, wherein the computer is further configured to:
receive recommendations for actions to each user;
identify, from the user action records, details of actions that have been taken by the certain user toward the partner user in a preset time period, the number of times the actions have been taken, details of the recommended actions taken by the certain user, and the number of times the recommended actions have been taken,
calculate a degree of interest that the certain user takes in the partner user based on the identified details of the actions, the identified number of times the actions have been taken, the identified details of the recommended actions, and the identified number of times the recommended actions have been taken;
determine whether a state of the relationship between the users is in an advancing state, in a stalled state, or in a receding state based on the similarity between the users and the degree of interest taken in the partner user; and
determine the level of the relationship between the users based on the state of the relationship.

23. The computer-readable recording medium according to claim 9, wherein the computer is further configured to select, from among a group of topics that have been prepared in advance, a selected topic that can be transmitted to the partner user based on the level of the relationship between the users and on preferences of the certain user and the partner user.

24. The computer-readable recording medium according to claim 23, wherein the computer is further configured to:
calculate degrees of preference for each topic included among the group of topics on a per-user basis;
select, as the topic that can be transmitted to the partner user, a first selected topic for which only the partner user exhibits a degree of preference equal to or greater than a set value, or a second selected topic for which both the certain user and the partner user exhibit a degree of preference equal to or greater than the set value, based on the level of the relationship between the users and on the degrees of preference calculated on the per-user basis;
determine a recommendation target user to whom the first or the second selected topic is to be recommended out of the certain user and the partner user based on information transmissibility of the certain user and the partner user or on contribution that the certain user and the partner user make to each other; and
determine the number of topics to be recommended to the recommendation target user in accordance with the level of the relationship between the users.

25. A system comprising:
a processor, communicatively coupled to a network, configured to:
determine a degree of similarity between a first user and a second user by comparing a first set of preferences of the first user with a second set of preferences of the second user;
calculate a degree of interest that the user takes in the partner user based on the actions and the number of times the actions have been performed in accordance with the formula C (input user, partner user)=AT (input user, partner user)/ATv
determine a degree of interest by the first user toward the second user by analyzing information about actions of the first user toward the second user; and
determine a state of a relationship between the first user and the second user based on the degree of similarity and the degree of interest, wherein the state of the relationship is one of an advancing state, a stalled state, and a receding state.

26. The system of claim 25, wherein the processor is further configured to:
determine a level of the relationship based on the state of the relationship, the degree of similarity, and the degree of interest.

27. The system of claim 26, wherein the level of the relationship is one of a stranger level, an intermediate level, and a friend level.

28. The system of claim 26, wherein the processor is further configured to:
determine a topic based on the level of the relationship, the first set of preferences, and the second set of preferences; and
send the topic to at least one of the first user and the second user.

29. The system of claim 26, wherein the processor is further configured to:
determine a topic based on the level of the relationship and the second set of preferences; and
send the topic to the second user.

30. The system of claim 27, wherein the processor is further configured to:
determine an amount of exchanged information between the first user and the second user, wherein the level of the relationship is determined based on the amount of exchanged information.

31. The system of claim 27, wherein the processor is further configured to recommend information for the first user to send to the second user based on the level of the relationship.

32. The system of claim 27, wherein the processor is further configured to send recommended information about the first user to the second user based on the level of the relationship.

33. The system of claim 32, wherein the recommended information comprises a name of the first user.

34. The system of claim 32, wherein the recommended information comprises a first preference of the first set of preferences of the first user based on the degree of similarity.

35. The system of claim 25, wherein the information about actions of the first user comprises at least one of type information, frequency information, and time information about actions of the first user toward the second user.

* * * * *